United States Patent
Frederick et al.

(10) Patent No.: US 10,232,793 B2
(45) Date of Patent: Mar. 19, 2019

(54) TRUCK BED INTEGRATED FOLD-OUT TABLE

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Adam D. Holmstrom, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/590,564

(22) Filed: May 9, 2017

(65) Prior Publication Data

US 2018/0326917 A1  Nov. 15, 2018

(51) Int. Cl.
| | | |
|---|---|---|
| *B60N 3/00* | (2006.01) | |
| *B60R 9/06* | (2006.01) | |
| *B60R 7/00* | (2006.01) | |
| *B60R 13/01* | (2006.01) | |
| *B60R 9/00* | (2006.01) | |
| *B60R 5/04* | (2006.01) | |
| *A47B 31/04* | (2006.01) | |
| *A47B 31/00* | (2006.01) | |

(52) U.S. Cl.
CPC ............... *B60R 9/06* (2013.01); *B60N 3/001* (2013.01); *B60R 7/00* (2013.01); *B60R 13/01* (2013.01); *A47B 31/001* (2013.01); *A47B 31/04* (2013.01); *B60R 5/041* (2013.01); *B60R 9/00* (2013.01)

(58) Field of Classification Search
CPC .... B60R 9/06; B60R 9/00; B60R 7/00; B60R 5/041; B60N 3/001; A47B 31/001; A47B 31/04
USPC ... 108/44, 115–135, 69–82, 83–90, 172–179
See application file for complete search history.

(56) References Cited

U.S. PATENT DOCUMENTS

| | | | | |
|---|---|---|---|---|
| 928,726 | A * | 7/1909 | Witthaus | |
| 2,451,275 | A * | 10/1948 | Cercownay | B60N 3/001 108/34 |
| 2,560,821 | A * | 7/1951 | Gray | A47B 1/056 108/147.22 |
| 2,622,353 | A * | 12/1952 | Mendelson | D06F 81/04 108/130 |
| 2,651,861 | A * | 9/1953 | Wood | D06F 81/003 108/169 |
| 3,105,448 | A * | 10/1963 | Patrie | A47B 3/02 108/134 |

(Continued)

*Primary Examiner* — Daniel J Troy
*Assistant Examiner* — Timothy M Ayres
(74) *Attorney, Agent, or Firm* — Christopher G. Darrow; Darrow Mustafa PC

(57) ABSTRACT

A foldable table structure is structured to be mountable on a vehicle. The table structure includes a first panel structured to form a first portion of a table top when the table structure is in a deployed condition, a second panel structured to form a second portion of a table top when the table structure is in a deployed condition, and at least one first support. Each of the at least one first support, the first panel, and the second panel are rotatably connected to at least one other of the at least one first support, the first panel, and the second panel, such that the first panel is rotatable to reside along a first side of the at least one first support, and such that the second panel is rotatable to reside along a second side of the at least one first support opposite the first side.

13 Claims, 12 Drawing Sheets

(56) References Cited

U.S. PATENT DOCUMENTS

| | | | | |
|---|---|---|---|---|
| 3,331,335 | A | * | 7/1967 | Warfield .............. A47B 83/045 |
| | | | | 108/134 |
| 3,476,432 | A | * | 11/1969 | Phillips .................. B60N 3/001 |
| | | | | 296/156 |
| 3,659,894 | A | * | 5/1972 | Dodgen .................... B60P 3/32 |
| | | | | 296/165 |
| 4,005,898 | A | | 2/1977 | Way |
| 5,069,142 | A | * | 12/1991 | Matre ...................... A47B 3/02 |
| | | | | 108/115 |
| 5,090,335 | A | | 2/1992 | Russell |
| 5,427,033 | A | * | 6/1995 | Bly ........................ B60N 3/002 |
| | | | | 108/44 |
| 5,730,066 | A | | 3/1998 | Auten et al. |
| 5,887,531 | A | * | 3/1999 | Covill .................... A47B 3/083 |
| | | | | 108/131 |
| 6,145,447 | A | | 11/2000 | Henderson |
| 7,628,439 | B1 | * | 12/2009 | Strong .............. B62D 33/0273 |
| | | | | 108/44 |
| 7,798,073 | B2 | | 9/2010 | Swailes et al. |
| 8,033,435 | B1 | * | 10/2011 | Brooke .................. B60R 9/065 |
| | | | | 108/167 |
| 8,517,413 | B2 | * | 8/2013 | Chen ....................... B25H 1/04 |
| | | | | 248/370 |
| 2003/0189074 | A1 | * | 10/2003 | Dise .......................... B60R 9/00 |
| | | | | 224/404 |
| 2005/0252429 | A1 | * | 11/2005 | Logan .................... B60N 3/001 |
| | | | | 108/147 |
| 2008/0257225 | A1 | * | 10/2008 | Chianale .................. A47B 3/10 |
| | | | | 108/11 |
| 2011/0309651 | A1 | * | 12/2011 | Hernandez ............ B60J 7/1621 |
| | | | | 296/100.08 |

\* cited by examiner

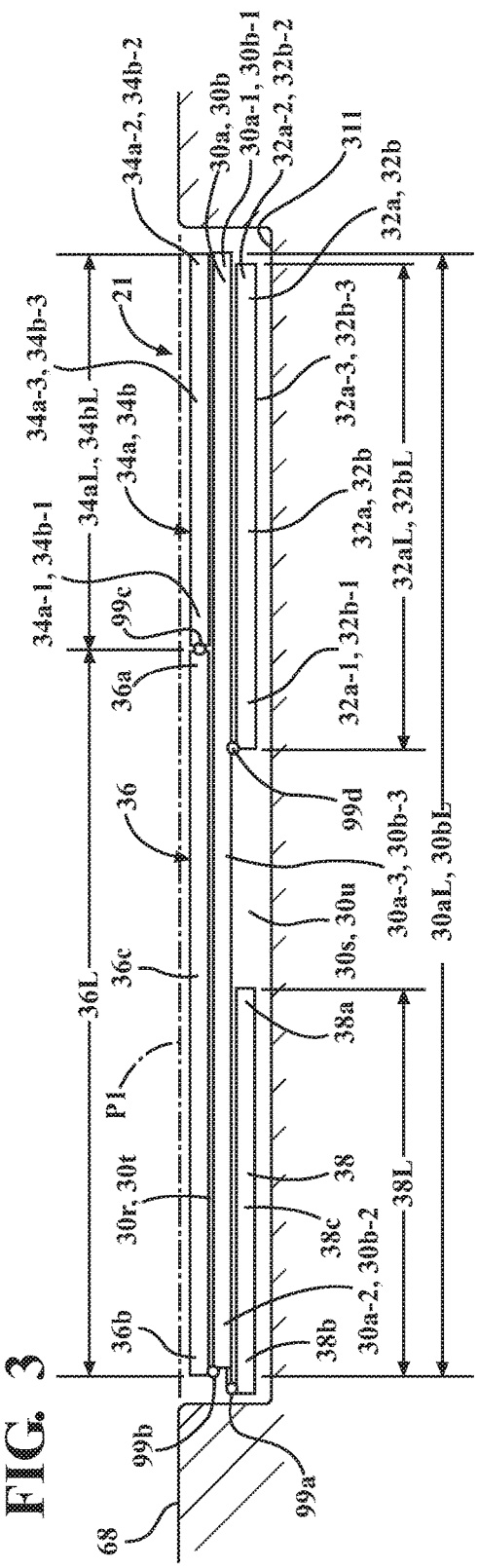
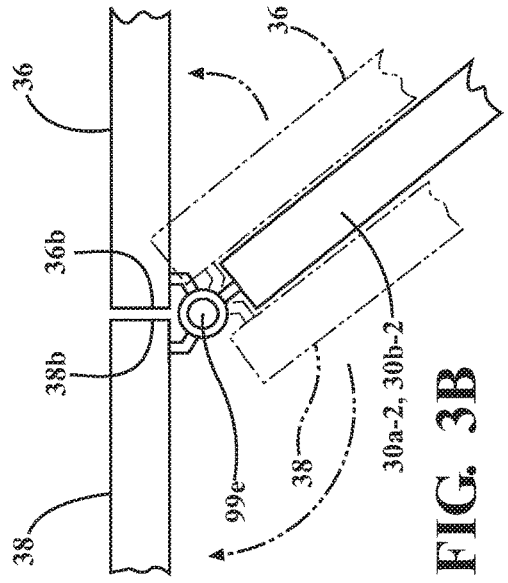
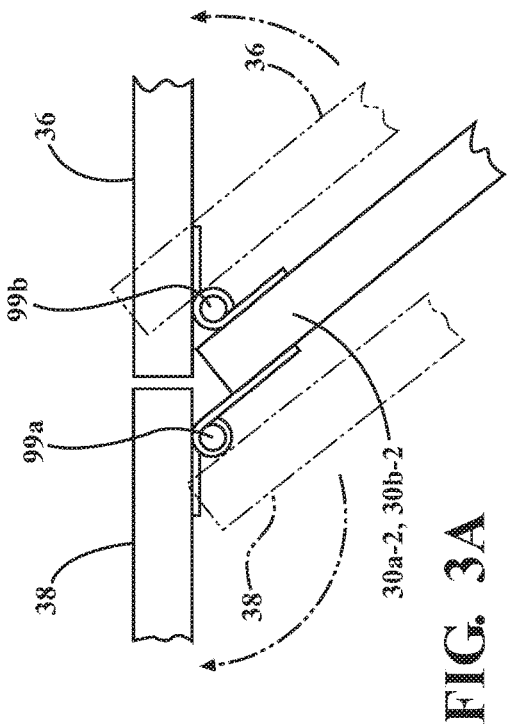
FIG. 3
FIG. 3A
FIG. 3B

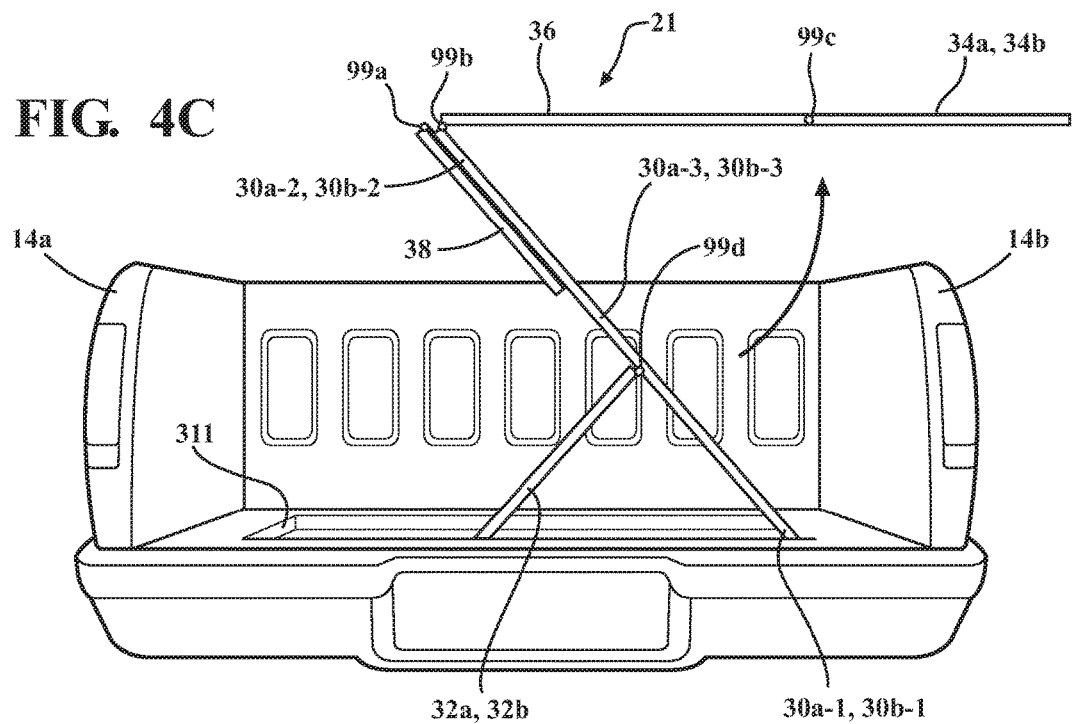
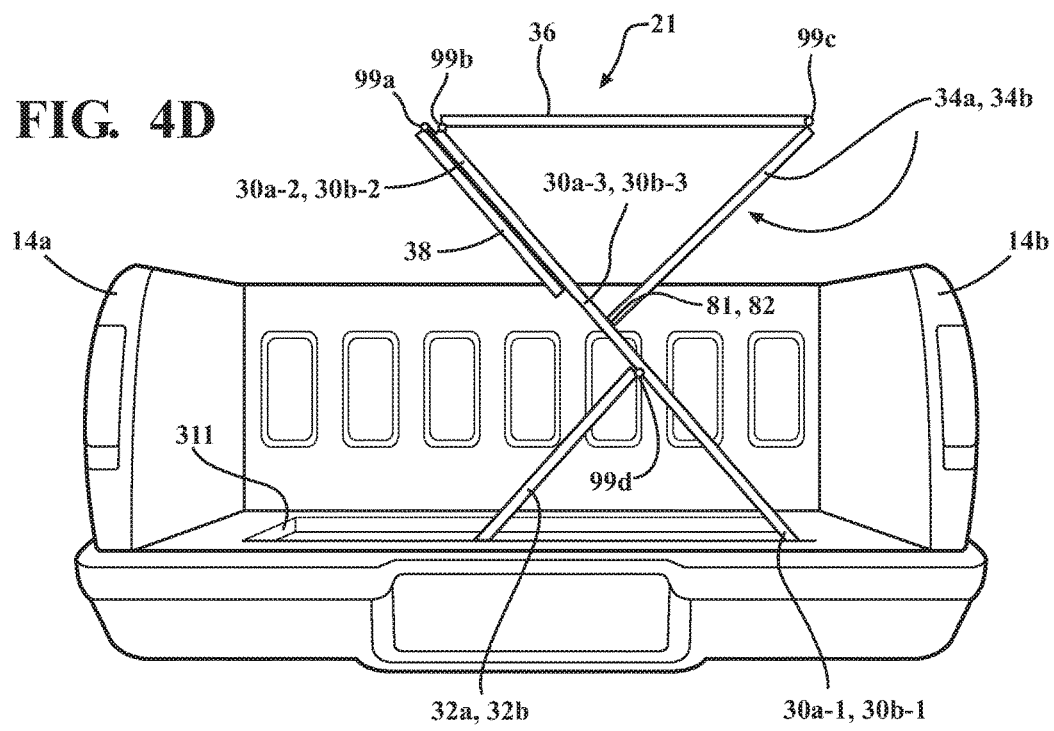

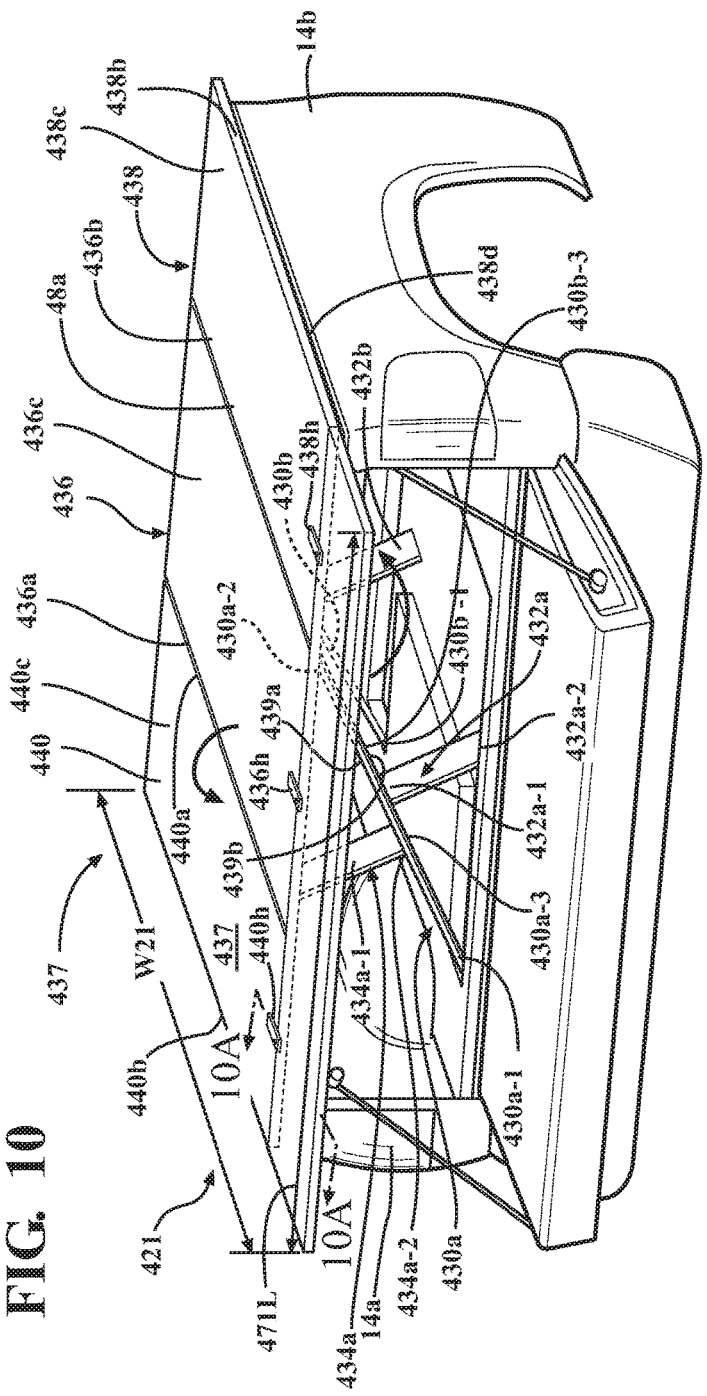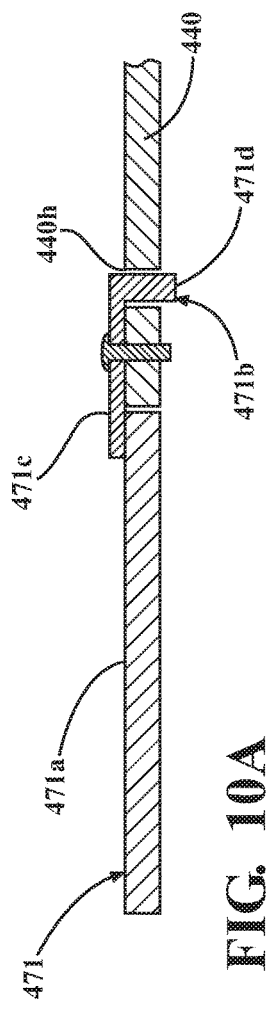
FIG. 10
FIG. 10A

TRUCK BED INTEGRATED FOLD-OUT TABLE

TECHNICAL FIELD

The present invention relates to stowable accessories which may be incorporated into vehicles, such as a van or a pickup truck.

BACKGROUND

Pickup truck owners may use their vehicles for recreational purposes, such as camping or picnics. A table may be useful for many of the activities the users may wish to engage in. However, it may be inconvenient or even impractical to load a table into the bed of a pickup along with other important items. In addition, a table may require special arrangements or a special trip to pick up. If the pickup truck users need a table but do not want to make a special trip to pick up a table or do not remember to pick up a table, the users may be forced to do without a table, or their choice of recreational locations or activities may be restricted. Also, in certain cases, users may not forsee needing a table at a particular location or on a particular trip, but would enjoy using a table if one were available.

SUMMARY

In one aspect of the embodiments described herein, a foldable table structure is provided. The foldable table structure is structured to be mountable on a vehicle. The table structure includes a first panel structured to form a first portion of a table top when the table structure is in a deployed condition, a second panel structured to form a second portion of the table top when the table structure is in a deployed condition, and at least one first support. Each of the at least one first support, the first panel, and the second panel is rotatably connected to at least one other of the at least one first support, the first panel, and the second panel, such that the first panel is rotatable to reside along a first side of the at least one first support, and such that the second panel is rotatable to reside along a second side of the at least one first support opposite the first side.

In another aspect of the embodiments described herein, a foldable table structure is provided. The foldable table structure is structured to be mountable to a vehicle. The table structure is configurable to a folded condition and a deployed condition. The table structure includes a first panel structured to form at least a first portion of a table top when the table structure is in a deployed condition. At least one first support is rotatably connected to the first panel. The at least one first support is rotatable so as to extend between the first panel and a surface on which the table structure is to rest in the deployed condition, to support the first panel when the table structure is in the deployed condition. At least one second support is rotatably connected to the at least one first support. The at least one second support is rotatable to extend between the at least one first support and a surface on which the table structure is to rest in the deployed condition, to support the at least one first support when the table structure is in the deployed condition. At least one third support is rotatably connected to the first panel. The at least one third support is rotatable to extend between the first panel and the at least one first support to support the first panel when the table structure is in the deployed condition.

BRIEF DESCRIPTION OF THE DRAWINGS

FIG. 3 is a schematic side view of the table structure of FIG. 1 in the folded condition of FIG. 2, and positioned in the cavity formed in a floor surface of the cargo bed, as viewed from a position behind the rear of the pickup truck.

FIG. 3A is a schematic view of a portion of a table structure showing exemplary rotational connections between first and second panels and a first support in accordance with an embodiment described herein, when the table structure is in a deployed condition.

FIG. 3B is a schematic view of a portion of a table structure showing rotational connections between first and second panels and a first support, in accordance with another embodiment described herein.

FIGS. 4A-4E are schematic side views of the table structure of FIG. 1 as viewed from a position behind the rear of the pickup truck, illustrating a method of deployment of the table structure.

FIG. 10 is a schematic perspective view of a table structure in accordance with an embodiment incorporating a table structure width extension member attached as described herein, shown in a deployed condition and mounted in a cargo bed of a pickup truck.

FIG. 10A is a schematic cross-sectional view of a portion of the table structure embodiment shown in FIG. 10.

DETAILED DESCRIPTION

Embodiments described herein relate to a foldable table structure structured to be mountable on a vehicle. The table structure may be mounted in the cargo bed of a pickup truck, as shown herein. In addition, the table structure may alternatively be mountable in a van or any other suitable vehicle.

The table structure is foldable for stowing in a suitable cavity provided in the vehicle, and may be unfolded or raised to a deployed condition in which it usable as a conventional table by a user. The table structure may include a table top and a series of supports rotatably connected to the table top and/or to each other. The supports may be structured to support the table top when the table structure is in the deployed condition. The table top may be formed from first and second panels positioned and secured so as to adjoin each other. One or more first supports may extend between the table top and a surface on which the table structure rests when in the deployed condition, for supporting a portion of the table top. One or more second supports may extend between the first support and the surface on which the table structure rests when in the deployed condition, for supporting the first support. One or more third supports may extend between the table top and the first support, for supporting another portion of the table top. In an alternative embodiment, the table top may be formed from a first panel, a second panel positioned and secured so as to adjoin the first panel along a first edge of the first panel, and a third panel positioned and secured so as to adjoin the first panel along a second edge of the first panel opposite the first edge of the first panel. When this embodiment is mounted in the cargo bed of a pickup truck, the table top may extend over or beyond one or more of the sidewalls of the cargo bed.

Figure 1:
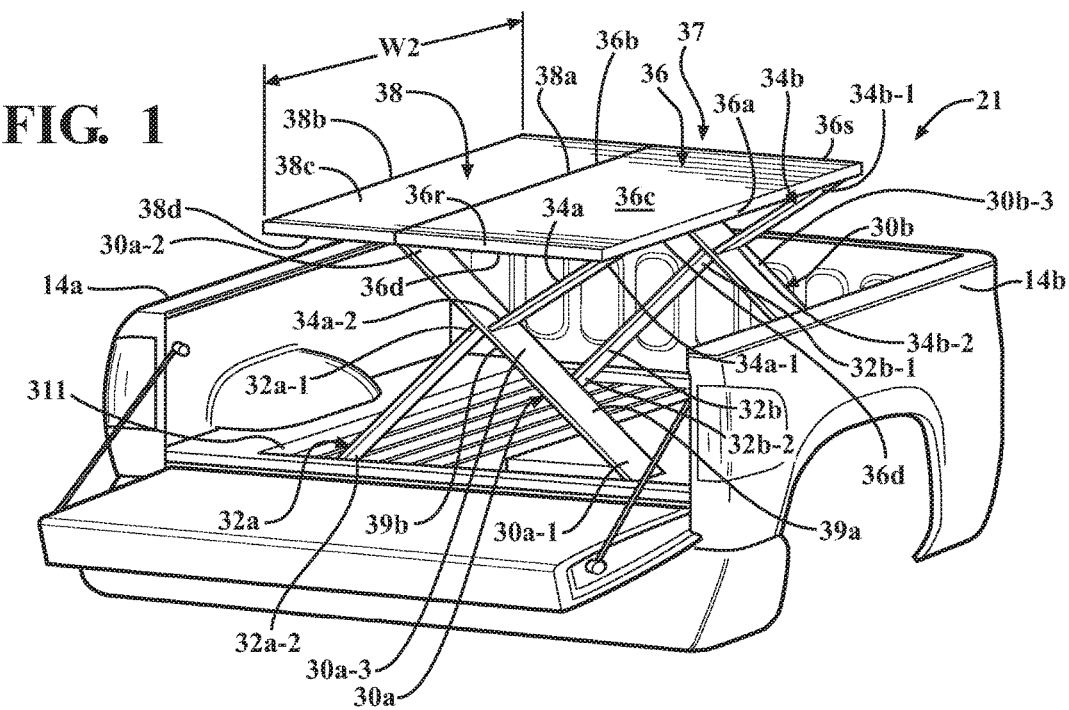
FIG. 1 is a schematic perspective view of a table structure in accordance with an embodiment described herein, shown in a deployed condition and mounted in a cargo bed of a pickup truck.
Figure 2:
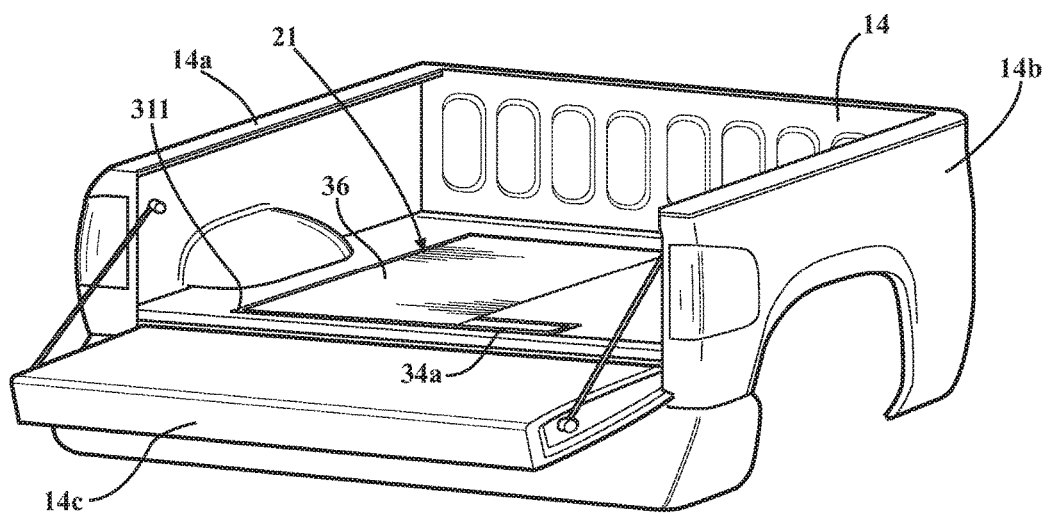
FIG. 2 is the schematic perspective view of FIG. 1, showing the table structure in a folded or stowed condition in a cavity formed in a floor surface of the cargo bed.

FIGS. 1-4E are various views of a foldable table structure 21 in accordance with an embodiment described herein. The foldable table structure may be structured for mounting to a vehicle. FIGS. 1-4E show an embodiment of the table structure as mountable in a cargo bed 14 of a pickup truck. However, the table structure may alternatively be mountable in a van or any other suitable vehicle. FIG. 1 shows the table structure 21 in a raised or deployed condition, suitable for normal use by a vehicle occupant. The table structure 21 may be folded from the deployed condition shown in FIG. 1 to a folded or stowed condition as shown in FIGS. 2 and 3.

In the folded condition, the table structure 21 may be received in a suitably-shaped recess or cavity 311 formed in a surface of the vehicle. In one or more arrangements, the cavity 311 may be formed in a surface of a metallic floor of the cargo bed. In other arrangements, the cavity may be formed in the floor of a polymeric bedliner secured within the cargo bed. The cavity 311 may be structured such that the table structure 21 does not extend above a plane P1 of the floor surface 68 when the table structure is positioned in the cavity in the folded condition. Cavity 311 and the table structure contained therein may be covered by a floor panel (not shown) structured to be flush with the floor surface 68 when the table structure is not in use.

Depending on the desired depth of the cavity 311, an opening may be formed in the metal floor of the cargo bed for receiving therein a cavity 311 (or a portion of a cavity) formed in a bedliner structured to be secured within the cargo bed. The portion of the bedliner containing the cavity 311 may then extend below the cargo bed floor surface 68, and may be exposed to the portions of the vehicle (for example, the transmission differential, etc.) under the cargo bed.

Referring again to FIGS. 1-4E, the table structure 21 may have a first panel 36, a second panel 38, at least one first support 30, at least one second support 32 rotatably connected to the at least one first support 30, and at least one third support 34 rotatably connected to the first panel 36. In the embodiment shown in FIGS. 1-4E, the table structure 21 includes a pair of spaced-apart first supports 30a, 30b, a pair of spaced-apart second supports 32a, 32b, and a pair of spaced-apart third supports 34a, 34b. As seen in FIG. 1, first support 30a, second support 32a, and third support 34a may be positioned along or adjacent a first lateral edge 36r of the table structure 21 to support a first side of the table structure, and another first support 30b, another second support 32b, and another third support 34b may be positioned along a second lateral edge 36s of the first panel 36 opposite the first lateral edge 36r, to support a second side of the table structure. As used herein, the term "rotatably connected" refers to a direct connection (for example, a hinge) connecting elements of the table structure. For example, in the embodiment shown in FIGS. 1 and 3, the second supports 32a and 32b may be directly rotatably connected to the first supports 30a and 30b, respectively. Also, the third supports 34a and 34b may be directly rotatably connected to the first panel 36.

First panel 36 and second panel 38 may be secured adjacent each other and may combine to form a table top 37 when the table structure is in the deployed condition shown in FIG. 1. First panel 36 may have a first edge 36a and a second edge 36b opposite the first edge. A first panel first or top surface 36c may extend between the edges 36a and 36b. First panel 36 may have a second surface 36d opposite the first surface 36c. First panel first surface 36c may form a portion of the table top 37 when the first and second panels 36 and 38 are rotated to horizontal orientations and secured as shown in FIG. 1. As seen in FIG. 3, the first panel 36 may have a length 36L which may extend along a width dimension of the cargo bed when the table structure 21 is folded. The deployed table top 37 may have a width dimension W2.

Second panel 38 may have a first edge 38a and a second edge 38b opposite the first edge. A second panel first surface 38c may extend between the edges 38a and 38b. Second panel 38 may have a second surface 38d opposite the first surface 38c. Second panel first surface 38c may reside adjacent first panel second edge 36b to form a portion of the table top 37 when the first and second panels 36 and 38 are rotated to horizontal orientations and secured as shown in FIG. 1. As seen in FIG. 3, the second panel 38 may have a length 38L which may extend along a width dimension of the cargo bed when the table structure 21 is stowed.

Referring again to FIGS. 1 and 3, first support 30a may have a first end 30a-1, a second end 30a-2 opposite the first end, and a body 30a-3 extending between the first and second ends. Similarly, first support 30b may have a first end 30b-1 (not shown in FIG. 1), a second end 30b-2 opposite the first end 30b-1, and a body 30b-3 extending between the first and second ends. First support first end 30b-1 may be aligned with first support first end 30a-1 and first support second end 30b-2 may be aligned with first support second end 30a-2 when the table structure is in the folded and deployed conditions. Aligned ends of the supports described herein may be aligned along axes extending parallel to a fore-aft axis of the vehicle. Support first ends 30a-1 and 30b-1 may be attached to a floor or wall of cavity 311 with removable or actuatable pins (not shown) which permit rotation of the first supports 30a and 30b with respect to the vehicle and also allow the table structure 21 to be removed from the vehicle if desired.

The first supports 30a and 30b may be rotatable so as to extend between the table top and a surface on which the table structure is to rest in the deployed condition, to support the table top when the table structure is in the deployed condition. A surface on which the table structure is to rest in the deployed condition may include any surface exterior of the table structure with which any of first supports 30a, 30b and second supports 32a and 32b is in contact, for purposes of supporting the table structure in its deployed condition.

Second support 32a may have a first end 32a-1, a second end 32a-2 opposite the first end, and a body extending between the first and second ends. Second support second end 32a-2 may be structured to be engageable with a surface (such as an interior surface of cavity 311 or a ground surface outside the vehicle, for example) on which the table structure is to rest when in the deployed condition, to support the first support 30a when the table structure is in the deployed condition.

Similarly, second support 32b may have a first end 32b-1, a second end 32b-2 opposite the first end 32b-1, and a body 32b-3 extending between the first and second ends. Second support second end 32b-2 may be structured to be engageable with a surface (such as an interior surface of cavity 311 or a ground surface outside the vehicle, for example) on which the table structure is to rest when in the deployed condition, to support the first support 30b when the table structure is in the deployed condition. Second support first end 32b-1 may be aligned with second support first end 32a-1 and second support second end 32b-2 may be aligned with second support second end 32a-2 when the table structure is in the folded and deployed conditions.

Third support 34a may have a first end 34a-1, a second end 34a-2 opposite the first end, and a body extending between the first and second ends. Third support 34a may be rotatable so as to reside along a first side of the first support 30a when the table structure is in a folded condition. Third support second end 34a-2 may be structured to be engageable with first support 30a so that third support 34a may support at least a portion of the first panel 36 when the table structure is in the deployed condition. Similarly, third support 34b may have a first end 34b-1 aligned with third support first end 34a-1, a second end 34b-2 opposite the first end 34b-1 and aligned with third support second end 34a-2, and a body extending between the first and second ends. Third support 34b may be rotatable so as to reside along a first side of the first support 30b when the table structure is in a folded condition. Third support second end 34b-2 may be structured to be engageable with first support 30b so that third support 34b may support at least a portion of the first panel 36 when the table structure is in the deployed condition.

The various rotational connections between the panels and supports described herein may be in any form or forms suitable for the purposes described herein. For example, one or more of the rotational connections may be in the form of hinges. Any of the rotational connections described herein may also incorporate rotational hard stops structured to limit the rotation of a connected element to a specific direction or to a specific amount of rotation. The various panels and supports described herein may also include locks, teeth, ribs and/or other engagement mechanisms positioned and structured to engage other ones of the panels and supports, to provide bearing surfaces and/or contact locations for contact between the panels and supports. These mechanisms may also lock or maintain the panels and supports in contact with each other until released by a user, to help maintain the table structure in the deployed condition when the table structure is shaken or loaded. For example, one or more locking mechanisms (not shown) may maintain first panel 36 and second panel 38 in the relationship shown in FIG. 1, so that the first and second panel surfaces 36c and 38c are coplanar or substantially coplanar and form table top 37.

The various panels and supports described herein may be formed using any suitable methods, using any materials suitable for the purposes described herein. For example, the supports and/or panels may be formed from a suitable polymer. In one or more arrangements, the various panels and supports described herein may be formed from the same material as a bedliner in which the cavity 311 may be formed.

In embodiments described herein, a first support, the first panel, and the second panel may be rotatably connected to at least one other of the first support, the first panel, and the second panel such that the first panel is rotatable to reside along the first side of the first support and such that the second panel is rotatable to reside along a second side of the first support opposite the first side, when the table structure is in the stowed condition. For example, referring to FIGS. 1 and 3, each of the first support 30a, the first panel 36, and the second panel 38 may be rotatably connected to at least one other of the first support 30a, the first panel 36, and the second panel 38 such that the first panel 36 is rotatable to reside along a first side 30r of the first support 30a and such that the second panel 38 is rotatable to reside along a second side 30s of the first support 30a opposite the first side 30r, when the table structure is in the stowed condition shown in FIG. 3. Similarly, each of the first support 30b, the first panel 36, and the second panel 38 may be rotatably connected to at least one other of the first support 30b, the first panel 36, and the second panel 38 such that the first panel 36 is rotatable to reside along a first side 30t of the first support 30b and such that the second panel 38 is rotatable to reside along a second side 30u of the first support 30b opposite the first side 30t, when the table structure is in the stowed condition shown in FIG. 3. Thus, the first support 30a, the first panel 36, and the second panel 38 may be coupled together so that they are rotatable with respect to each other, and the first support 30b, the first panel 36, and the second panel 38 may be coupled together so that they are rotatable with respect to each other.

Any of a variety of connection arrangements may be used to couple the first supports 30, the first panel 36, and the second panel 38. For example, common or shared hinges for connecting the first panel 36 to the second panel 38 may be attached to first panel 36 along first panel second edge 36b and/or to second panel 38 along second panel first edge 38a. Any of the foldable table structure elements described herein may be rotatably connected to each other using any suitable method, at any locations on the elements suitable for the purposes described herein.

In another example, the second panel 38 may be rotatably connected to the first panel 36 by a first rotational connection or group of rotational connections (not shown), such as hinges, for example, while the first support 30a may be rotatably connected to the first panel 36 by a second rotational connection or group of rotational connections such as 99b. In this case, first support 30a and second panel 38 may not be rotatably connected by a common or shared rotational connection. However, the first support 30a and second panel 38 may be rotatable with respect to each other by virtue of the rotational connections 99b between the first support 30a and the first panel 36, and the rotational connections between the first and second panels. Similar connections may be formed between the other first support 30b, the first panel 36, and the second panel 38.

Alternatively, the second panel 38 may be rotatably connected to the first panel 36 by a first rotational connection or group of connections (not shown), while the first support 30a may be rotatably connected to the second panel 38 by a second rotational connection or group of rotational connections, such as 99a. In this case, first support 30a and first panel 36 may not be rotatably connected by a common or shared rotational connection. However, the first support 30*a* and first panel 36 may be rotatable with respect to each other by virtue of the rotational connections 99*a* between the first support 30*a* and the second panel 38, and the rotational connections between the first panel and the second panel. Similar connections may be formed between the other first support 30*b*, the first panel 36, and the second panel 38.

Alternatively, and as seen in FIG. 3A for example, the second panel 38 may be rotatably connected to the first support 30*a* by a first rotational connection or group of rotational connections 99*a*, while the first support 30*a* may be rotatably connected to the first panel 36 by a second rotational connection or group of rotational connections 99*b*. In this case, first panel 36 and second panel 38 may not be directly rotatably connected by a common or shared rotational connection. However, the second panel 38 and the first panel 36 may be rotatable with respect to each other by virtue of the rotational connections 99*a* between the first support 30*a* and the second panel 38, and the rotational connections 99*b* between the first support 30*a* panel and the first panel 36. As shown in FIG. 3A, first and second panels 36 and 38 may be rotated about rotational connections 99*a* and 99*b*, respectively, to their deployed orientations as shown in FIG. 1. Similar connections may be formed between the other first support 30*b*, the first panel 36, and the second panel 38.

In a particular embodiment, all of the first support 30*a*, the first panel 36, and the second panel 38 may be rotatably and coaxially connected to each other along a common or shared rotational connection, as shown in FIG. 3B. For example, a hinge element may extend from an edge of the first support 30*a*, and additional hinge elements connected to the first panel 36 and second panel 38 may be rotationally connected to the first support hinge element using a common hinge pin to form rotational connections 99*e*.

As shown in FIG. 3B, first and second panels 36 and 38 may be rotated about rotational connections 99*e* to their deployed orientations shown in FIG. 1. For example, hinge elements connecting the first panel 36, second panel 38, and first supports 30*a*, 30*b* may be coaxially interleaved in a known manner similar to a door rotationally attached to a wall or a door frame. Similar connections may be formed between the other first support 30*b*, the first panel 36, and the second panel 38. Also similar rotational connections (i.e., with hinge elements extending from ends or edges of a panel or support as shown in FIG. 3B) may be formed between any two elements which are rotationally connected to each other.

Referring to FIGS. 1 and 3, second support first end 32*a*-1 may be rotatably connected to first support 30*a* along the body 30*a*-3 of first support 30*a*. As seen in FIG. 3, second support 32*a* may reside along the second side 30*s* of first support 30*a* when the table structure is folded. Similarly, second support first end 32*b*-1 may be rotatably connected to first support 30*b* along the body 30*b*-3 of first support 30*b*. Second support 32*b* may reside along the second side 30*u* of first support 30*b* when the table structure is folded.

Third support first end 34*a*-1 may be rotatably connected to first panel 36 along edge 36*a* or along another portion of the first panel 36. As seen in FIG. 3, third support 34*a* resides along the first side 30*r* of first support 30*a* when the table structure is folded. Also, third support first end 34*b*-1 may be rotatably connected to first panel 36 along edge 36*a* or along another portion of the first panel 36. Third support 34*b* resides along the first side 30*t* of first support 30*b* when the table structure is folded.

FIG. 3 is a schematic side view of the foldable table structure 21 of FIGS. 1 and 2, shown in a stowed condition. FIG. 3 shows the relative positions of the various panels and supports when the table structure 21 is folded into the cargo bed cavity 311. Length 36L of the first panel 36, length 38L of the second panel 38, lengths 30*a*L and 30*b*L of the first supports 30*a* and 30*b*, lengths 32*a*L and 32*b*L of the second supports 32*a* and 32*b*, and lengths 34*a*L and 34*b*L of the third supports 34*a* and 34*b* may be specified to any values required or desirable for a particular application, depending on such factors as the dimensions of the floor or cargo bed in which the table structure is to be stowed, the available height within any enclosure in which the table structure is to be deployed, the support and panel dimensions required to provide a horizontal table top when the tale structure is deployed, and other pertinent factors.

FIG. 3 schematically also shows various rotational connections between elements of the table structure 21. For example, FIG. 3 schematically illustrates rotational connection(s) 99*b* between first panel 36 and first support 30*a* and between first panel 36 and first support 30*b*, enabling relative rotation of the first panel 36 and the first support 30*a* and relative rotation of the first panel 36 and the first support 30*b*. The rotational connection(s) 99*b* between first panel 36 and first support 30*a* and between first panel 36 and first support 30*b* may be coaxial or substantially coaxial.

Also, FIG. 3 schematically illustrates rotational connection(s) 99*a* between first support 30*a* and second panel 38 and between first support 30*b* and second panel 38, enabling relative rotation of the first support 30*a* and the second panel 38 and relative rotation of the of the first support 30*b* and the second panel 38. The rotational connection(s) 99*a* may also be coaxial or substantially coaxial.

Also, FIG. 3 schematically illustrates rotational connection(s) 99*c* between first panel 36 and third support 34*a* and between first panel 36 and third support 34*b*, enabling relative rotation of the first panel 36 and the third support 34*a* and relative rotation of the first panel 36 and the third support 34*b*. The rotational connection(s) 99*c* may also be coaxial or substantially coaxial.

Also, FIG. 3 schematically illustrates rotational connection(s) 99*d* between first support 30*a* and second support 32*a* and between first support 30*b* and second support 32*b*, enabling relative rotation of the first support 30*a* and second support 32*a*, and relative rotation of the first support 30*b* and second support 32*b*. The rotational connection(s) 99*d* may also be coaxial or substantially coaxial.

One or more of the rotational connections described herein may be combined into a single rotational connection, such as a shared hinge mechanism, for example, as shown in FIG. 3B.

Figure 4A:
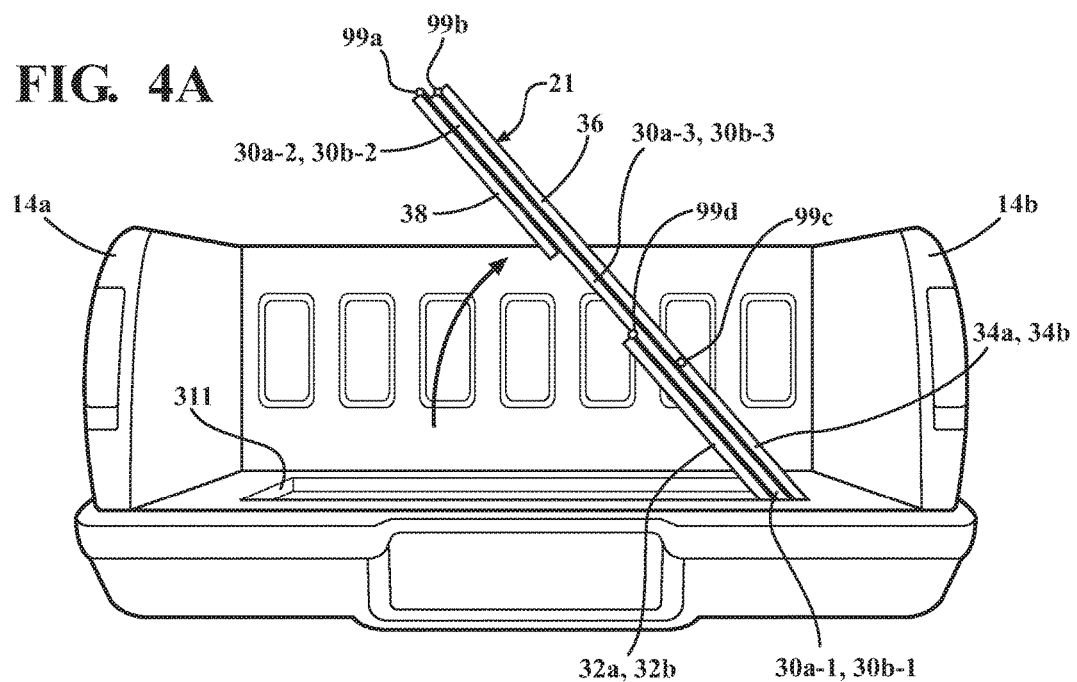

Unfolding or deploying the table structure 21 will now be discussed with reference to FIGS. 1-4E. The foldable table structure may be structured to be pivotable about an end of one or more first supports 30*a*, 30*b* when the table structure is mounted on the vehicle. Referring to FIG. 4A, in a first step, the entire table structure 21 may be rotated out of the cargo bed cavity 311 in its folded condition, about edges of the cavity 311 at or near which the first ends 30*a*-1 and 30*b*-1 of first supports 30*a* and 30*b* reside when the table structure 21 is received in the cavity 311 in the folded condition.

Figure 4B:
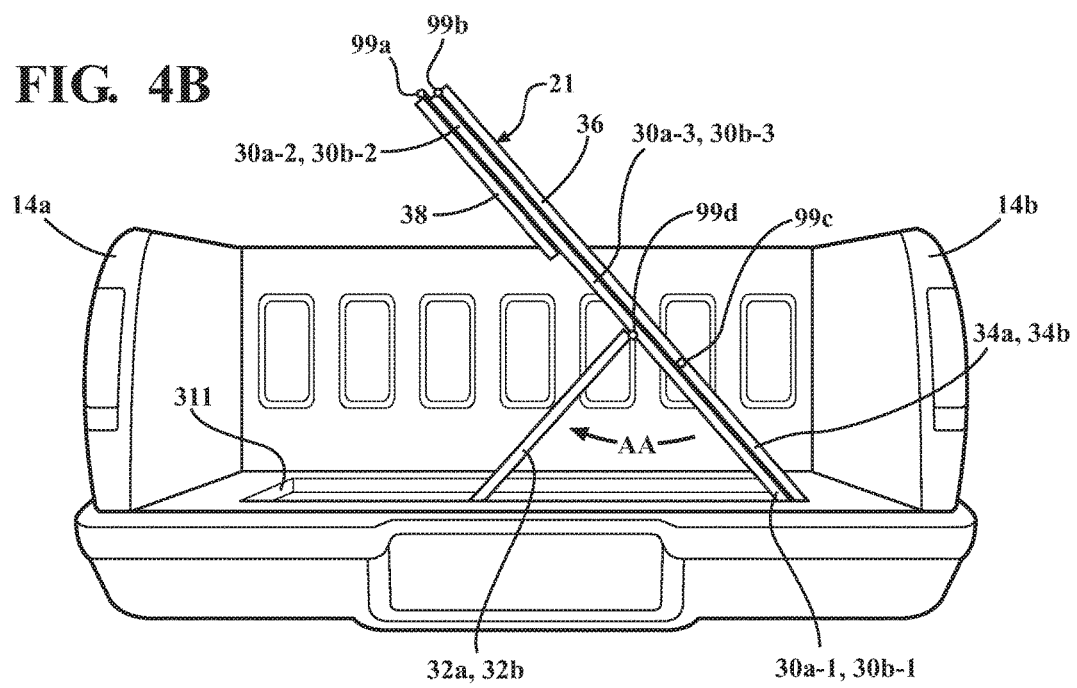

After the folded table structure 21 is rotated out of the cavity 311 to a sufficient degree, second support 32*a* may be rotated about a rotatable connection 99*d* away from first support 30*a* in the direction of arrow AA, as shown in FIG. 4B. Second support 32*a* may be rotated to a configuration where second support second end 32*a*-2 may be positioned on a surface on which the deployed table structure is to rest. In this orientation, the second support 32a may help support the first support 30a in its raised orientation. The surface may be a floor of cavity 311 or another surface. In one or more arrangements, the surface may include corrugations or serrations structured to provide bearing surfaces for the second ends 32a-2, 32b-2 of second supports 32a, 32b, respectively, when the second supports are unfolded. The amount of rotation of the second support 32a with respect to the first support 30a may be controlled using a suitable rotational hard stop, as previously described.

Similarly, after the folded table structure 21 is rotated out of the cavity 311 to a sufficient-degree, second support 32b may be rotated about a rotatable connection 99d away from first support 30b in the direction of arrow AA. Second support 32b may be rotated to a configuration where second support second end 32b-2 may be positioned on the surface on which the deployed table is to rest. In this orientation, the second support 32b may help support the first support 30b in its raised orientation. The amount of rotation of the second support 32b with respect to the first support 30b may be controlled using cavity floor bearing surfaces or a suitable rotational hard stop, as previously described.

Referring to FIG. 4C, in a next step, the first panel 36 may be rotated upwardly about rotational connections 99b to a horizontal orientation.

Next, referring to FIG. 4D, third supports 34a and 34b may then be rotated about rotational connection(s) 99c. Third support 34a may be rotated to a designated contact location 81 along first support body 30a-3, between first support first end 30a-1 and first support second end 30a-2. The desired location 81 of contact between the third support 34a and the first support 30a may be specified so as to help support and maintain the first panel 36 in a horizontal orientation when the third support second end 34a-2 is in contact with the first support 30a. One or more hardware elements may be positioned at third support second end 34a-2 and/or along the first support 30a at the desired location 81 of contact between the third support 34a and the first support 30a, to help fix the desired contact location and maintain contact.

Similarly, third support 34b may be rotated to a designated contact location 82 along first support body 30b-3, between first support first end 30b-1 and first support second end 30b-2. The desired location 82 of contact between the third support 34b and the first support 30b may be specified so as to help support and maintain the first panel 36 in a horizontal orientation when the third support second end 34b-2 is in contact with the first support 30b. One or more hardware elements may be positioned at third support second end 34b-2 and/or along the first support 30b at the desired location 82 of contact between the third support 34b and the first support 30b, to help fix the desired contact location and maintain contact.

Figure 4E:
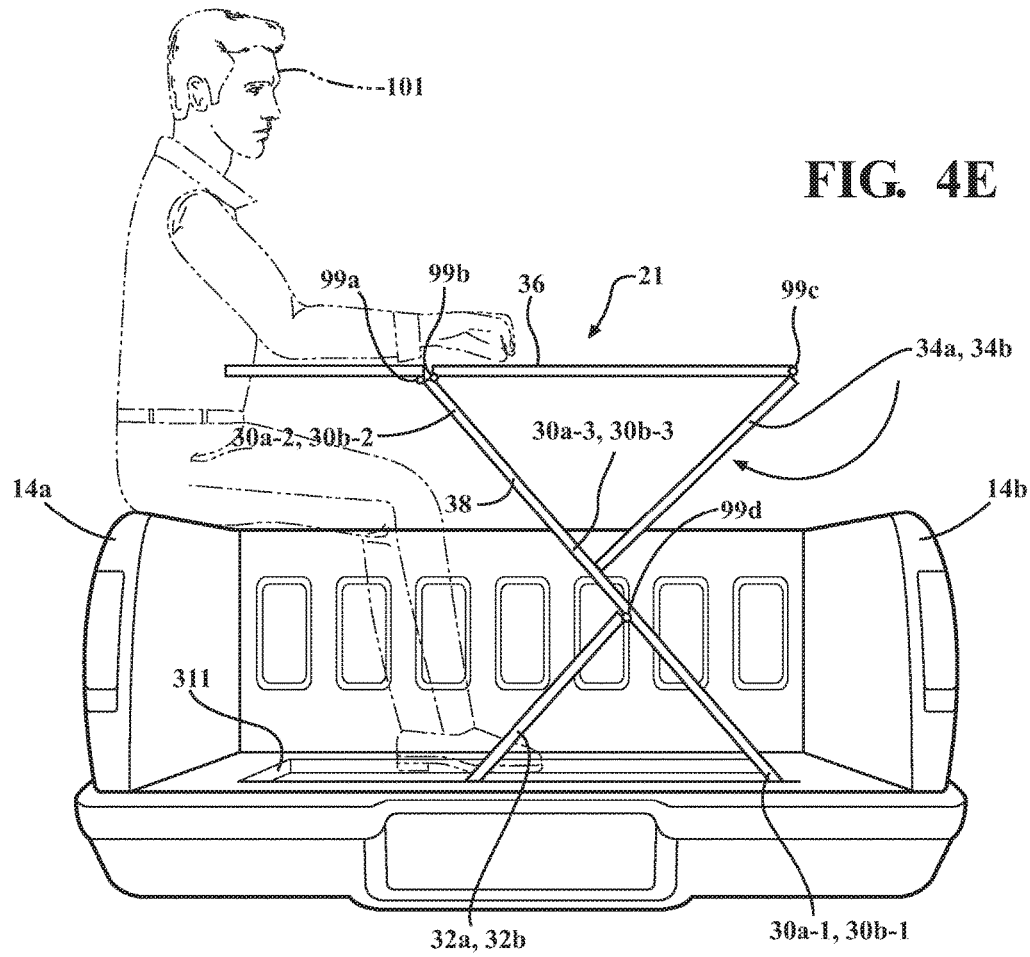

Referring to FIG. 4E, in a next step, the second panel 38 may be rotated about rotational connection(s) 99a into a horizontal orientation. The first and second panels 36 and 38 may be structured and rotatably connected to each other and/or to other portions of the table structure so that first panel first surface 36c and second panel first surface 38c are coplanar or substantially coplanar when the panels 36 and 38 are oriented and secured horizontally as shown in FIG. 4E. The second panel 38 may then be locked in this orientation using a locking mechanism (not shown) positioned at a junction between the first panel 36 and the second panel 38. In this orientation and position, the second panel is secured adjacent to first panel 36 so that first panel table top surface 36c and second panel first surface 38c are adjacent each other, combining to form a table top 37 for the table structure in the deployed condition.

The table structure may be folded back into its stowable configuration by reversing the procedure described above. The elements of the table structure 21 may be structured and connected so that the table top 37 of the deployed table structure resides at a height which permits a user 101 to comfortably use the table structure 21 when seated along upper surfaces of the bed sidewalls and/or the tailgate, as shown in FIG. 4E.

Figure 8:
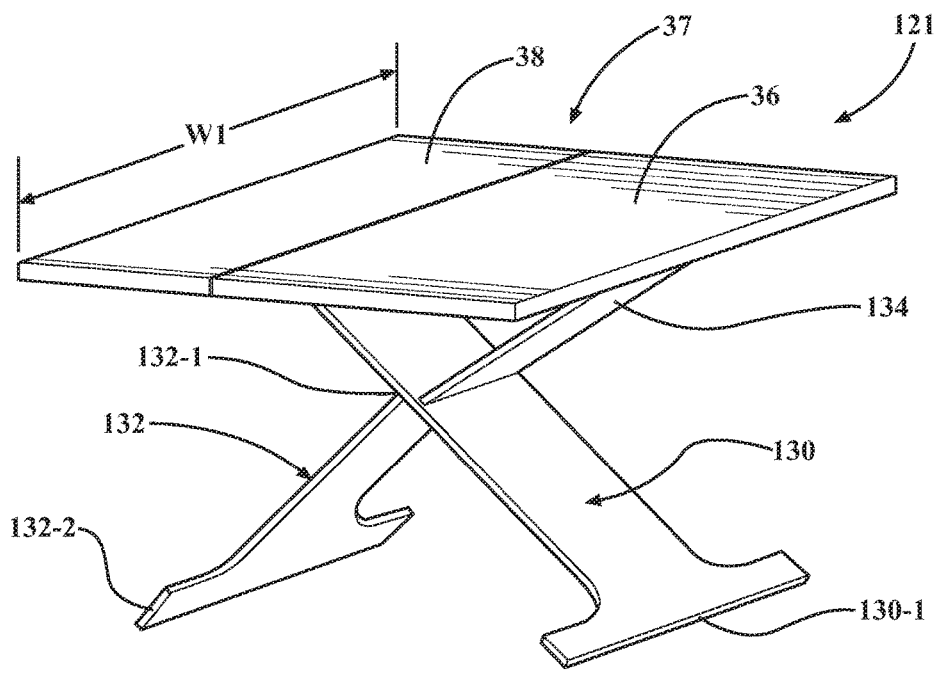
FIG. 8 is a schematic perspective view of a table structure in accordance with another embodiment described herein, shown in a deployed condition.

Although the table structure embodiment 21 shown in FIGS. 1-4E includes two spaced apart sets of supports, in one or more arrangements, an embodiment 121 of the table structure may be supported by a single set of supports as shown in FIG. 8. For example, to facilitate support of the table structure 121 by a single set of supports, end portions and/or other portions of a first support 130, a second support 132, and third support 134 may be widened or otherwise structured for purposes of load distribution, and also may be centered with respect to a width dimension W1 of the table top 37. Rotational hardstops and engagement features may be incorporated into the panels and supports as previously described, to help maintain the table structure 121 in the deployed condition. The table structure embodiment shown in FIG. 8 may be stowed, and deployed in a cargo bed, or the table structure may be removed from the cargo bed and deployed on a ground surface, for example.

FIGS. 5-7E are various views of a foldable table structure 221 in accordance with another embodiment described herein. The foldable table structure may be structured for mounting to a vehicle. FIGS. 5-7E show an embodiment of the table structure mounted in a cargo bed of a pickup truck. However, the table structure may alternatively be mountable in a van or any other suitable vehicle. The table structure 221 may be structured similarly to table structure 21 previously described, except that the table structure 221 may incorporate a third panel 240 in addition to first and second panels 236 and 238. Third panel 240 may be structured to combine with first and second panels 236 and 238 to form a third portion of a table top 237, thereby providing an enlarged table top when the table structure 221 is in the deployed condition. In addition, the table structure 221 may be designed such that a table top 237 of the deployed table structure 221 at least overlies or extends over (and, optionally, past) one or more of the sidewalls 14a, 14b, and/or tailgate 14c of the cargo bed 14.

Figure 5:
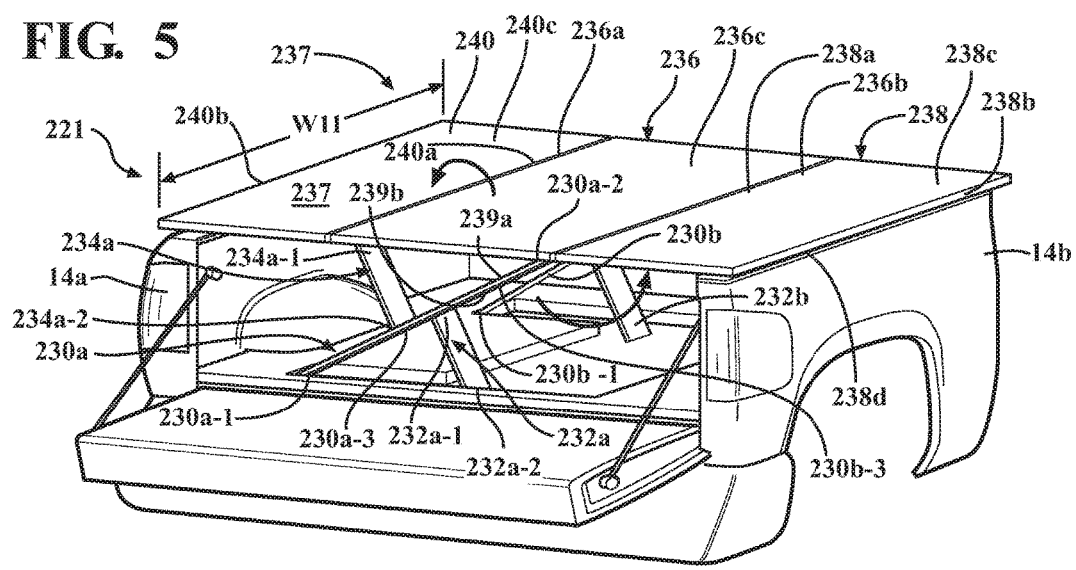
FIG. 5 is a schematic perspective view of a table structure in accordance with another embodiment described herein, shown in a deployed condition and mounted in a cargo bed of a pickup truck.
Figure 6:
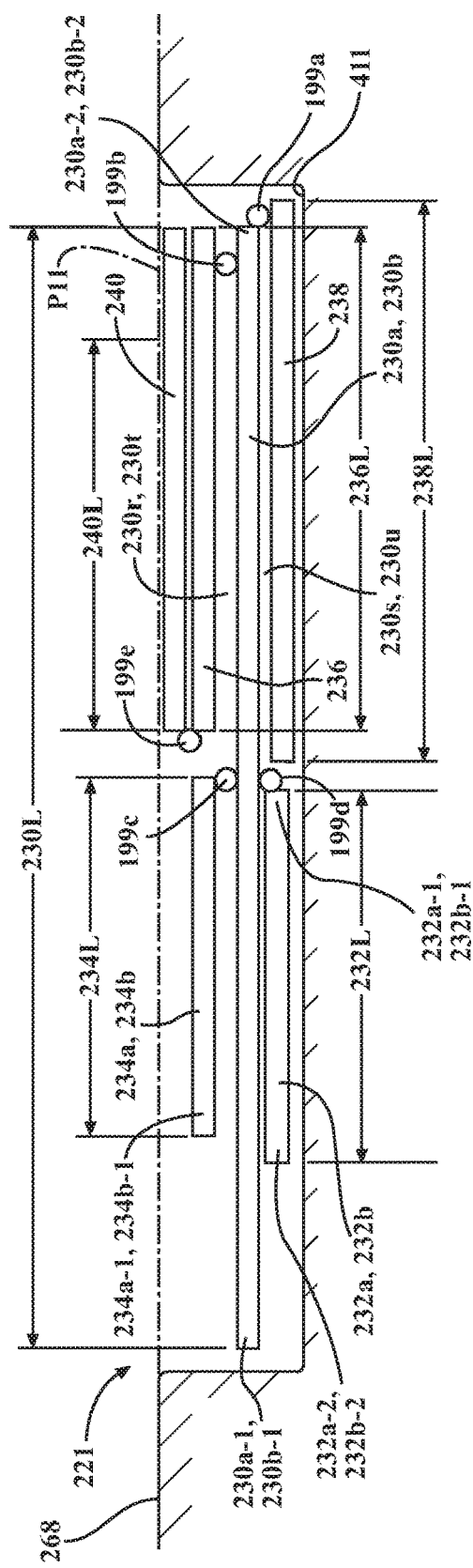
FIG. 6 is a schematic side view of the table structure of FIG. 5 shown in a folded condition, and positioned in a recess or cavity formed in a floor surface of the cargo bed, as viewed from a position behind the rear of the pickup truck.

FIG. 5 shows the table structure 221 in a raised or deployed condition, suitable for normal use by a vehicle occupant. The table structure 221 may be folded from the deployed condition shown in FIG. 5 to a folded condition as shown in FIG. 6. In the folded condition, the table structure 221 may be received or stowed in a suitably-shaped cavity 411 formed in a surface of the vehicle. The cavity 411 may be structured such that the table structure 221 does not extend above a plane P11 of the floor surface 268 when the table structure is positioned in the cavity in the folded condition. Cavity 411 and the table structure contained therein may be covered by a floor panel (not shown) structured to be flush with the floor surface 268 when the table structure is not in use.

In one or more arrangements, the cavity 411 may be formed in a metallic floor of the cargo bed. In other arrangements, the cavity may be formed in the floor of a polymeric bedliner secured within the cargo bed. Depending on the desired depth of the cavity 411, an opening may be formed in the metal floor of the cargo bed for receiving therein a cavity (or a portion of a cavity) formed in a bedliner structured to be secured within the cargo bed. The portion of the bedliner containing the cavity may then extend below the cargo bed floor surface 268, and may be exposed to the portions of the vehicle (for example, the transmission differential, etc.) under the cargo bed.

Referring to FIGS. 5-7E, the table structure may have a first panel 236, a second panel 238, a third panel 240, at least one first support 230, at least one second support 232, and at least one third support 234. In the embodiment shown in FIGS. 5-7E, the table structure 221 includes a pair of spaced-apart first supports 230a, 230b, a pair of spaced-apart second supports 232a, 232b, and a pair of spaced-apart third supports 234a, 234b. As seen in FIG. 5, first support 230a, second support 232a, and third support 234a may be positioned along or adjacent a first lateral edge 236r of the table structure 221 to support a first side of the table structure, and another first support 230b, another second support 232b, and another third support 234b may be positioned along a second lateral edge 236s of the table structure opposite the first lateral edge 236r, to support a second side of the table structure. For example, in the embodiment shown in FIGS. 1 and 3, the second supports 32a and 32b may be directly rotatably connected to the first supports 30a and 30b, respectively. Also, the third supports 34a and 34b may be directly rotatably connected to the first panel 36. First panel 36 and second panel 38 may be secured adjacent each other and may combine to form a portion of table top 237 when the table structure is in the deployed condition shown in FIG. 5.

First panel 236 may have a first edge 236a and a second edge 236b opposite the first edge. A first panel first or top surface 236c may extend between the edges 236a and 236b. First panel 236 may have a second surface 236d (not shown) opposite the first surface 236c, forming an underside of the first panel when the table structure 221 is deployed. Panel first surface 236c may form a portion of table top 237 when the first and second panels 236 and 238 are rotated to horizontal orientations and secured as shown in FIG. 5. As seen in FIG. 6, the first panel 236 may have a length dimension 236L which may extend along a width dimension of the cargo bed when the table structure 221 is folded.

Second panel 238 may have a first edge 238a and a second edge 238b opposite the first edge. A second panel first surface 238c may extend between the edges 238a and 238b. Second panel 238 may have a second surface 238d opposite the first surface 238c, forming an underside of the second panel when the table structure 221 is deployed. Second panel first surface 238c may form a portion of the table top 237 when the first and second panels 236 and 238 are rotated to horizontal orientations and secured as shown in FIG. 5. As seen in FIG. 6, the second panel 238 may have a length 238L which may extend along a width dimension of the cargo bed when the table structure 221 is folded.

Third panel 240 may be rotatably connected to first panel 236 at or near first edge 236a. Third panel 240 may have a first edge 240a, a second edge 240b, and a first surface 240c extending between the first and second edges. Third panel 240 may have a second surface 240d (not shown) opposite the first surface 240c, forming an underside of the third panel when the table structure 221 is deployed. As seen in FIG. 6, the third panel 240 may have a length 240L which may extend along a width dimension of the cargo bed when the table structure 221 is stowed.

As seen in FIG. 6, the first support 230a may reside along a first side of the first panel 236 when the first panel 236 is rotated such that the first panel 236 resides along the first sides 230r, 230t of the first supports 230a and 230b. In addition, the third panel 240 may be rotatably connected to the first panel 236 such that the third panel 240 is rotatable to reside along a second side of the first panel 236 opposite the first side of the first panel.

First panel first surface 236c, second panel first surface 238c, and third panel first surface 240c may combine to form table top 237 when the table structure 221 is in the deployed condition shown in FIG. 5. The third panel 240 may be structured to be securable in a horizontal orientation adjoining the first panel 236 along the first edge 236a of the first panel. Second panel 238 may be structured to be securable in a horizontal orientation adjoining the first panel 236 along the second edge 236b of the first panel 236 opposite the first edge 236a, to form the table top 237 when the table structure is in the deployed condition.

Referring to FIGS. 5 and 6, first support 230a may have a first end 230a-1, a second end 230a-2 opposite the first end, and a body 230a-3 extending between the first and second ends. Similarly, first support 230b may have a first end 230b-1 aligned with first support first end 230a-1, a second end 230b-2 opposite the first end and aligned with first support second end 230a-2, and a body 230b-3 extending between the first and second ends 230b-1 and 230b-2. Aligned ends of the supports may be aligned along axes extending parallel to a fore-aft axis of the vehicle. Support first ends 230a-1 and 230b-1 may be attached to a floor or wall of cavity 411 with removable or actuatable pins which permit rotation of the first supports 230a and 230b with respect to the vehicle and also allow the table structure 221 to be removed from the vehicle if desired.

The first supports 230a and 230b may be rotatable so as to extend between the table top 237 and a surface on which the table structure is to rest in the deployed condition, to support the table top when the table structure 221 is in the deployed condition. A surface on which the table structure is to rest in the deployed condition may include any surface exterior of the table structure with which any of first supports 230a, 230b and second supports 232a and 232b is in contact, for purposes of supporting the table structure in its deployed condition.

Second support 232a may have a first end 232a-1, a second end 232a-2 opposite the first end, and a body extending between the first and second ends. Similarly, second support 232b may have a first end 232b-1 (not shown in FIG. 5) aligned with second support first end 232a-1, a second end 232b-2 opposite the first end and aligned with second support second end 232a-2, and a body extending between the first and second ends 232b-1 and 232b-2.

Third support 234a may have a first end 234a-1, a second end 234a-2 opposite the first end, and a body extending between the first and second ends. Similarly, third support 234b (not shown in FIG. 5) may have a first end 234b-1 aligned with third support first end 232a-1, a second end 234b-2 opposite the first end 234b-1 and aligned with third support second end 234a-2, and a body 234a-3 extending between the first and second ends 234b-1 and 234b-2.

Referring to FIGS. 5 and 6, each of the first support 230a, the first panel 236, and the second panel 238 may be rotatably connected to at least one other of the first support 230a, the first panel 236, and the second panel 238 such that the first panel 236 is rotatable to reside along a first side 230r of the first support 230a and such that the second panel 238 is rotatable to reside along a second side 230s of the first support 230a opposite the first side 230r, when the table structure is in the stowed condition shown in FIG. 6. Similarly, each of the first support 230b, the first panel 236, and the second panel 238 may be rotatably connected to at least one other of the first support 230b, the first panel 236, and the second panel 238 such that the first panel 236 is rotatable to reside along a first side 230t of the first support 230b and such that the second panel 238 is rotatable to reside along a second side 230u of the first support 230b opposite the first side 230t, when the table structure is in the stowed condition shown in FIG. 6. Thus, the first support 230a, the first panel 236, and the second panel 238 may be coupled together so that they are rotatable with respect to each other, and the first support 230b, the first panel 236, and the second panel 238 may be coupled together so that they are rotatable with respect to each other.

Any of a variety of connection arrangements may be used to couple the first supports 230, the first panel 236, and the second panel 238. For example, common or shared hinges for connecting the first panel 236 to the second panel 238 may be attached to first panel 236 along first panel second edge 236b and/or to second panel 238 along second panel first edge 238a.

In another example, the second panel 238 may be rotatably connected to the first panel 236 by a first rotational connection or group of rotational connections (not shown), while the first support 230a may be rotatably connected to the first panel 236 by a second rotational connection or group of rotational connection 199b. In this case, first support 230a and second panel 238 may not be directly connected by a common rotational connection. However, the first support 230a and second panel 238 may be rotatable with respect to each other by virtue of the rotational connections 199b between the first support 230a and the first panel 236, and the rotational connections between the first and second panels. Similar connections may be formed between the other first support 230b, the first panel 236, and the second panel 238.

Alternatively, the second panel 238 may be rotatably connected to the first panel 236 by a first rotational connection or group of rotational connections (not shown), while the first support 230a may be rotatably connected to the second panel 238 by a second rotational connection or group of rotational connections 199a. In this case, first support 230a and first panel 236 may not be directly rotatably connected by a common rotational connection. However, the first support 230a and first panel 236 may be rotatable with respect to each other by virtue of the rotational connections 199a between the first support 230a and the second panel 238, and the rotational connections between the first panel and the second panel. Similar connections may be formed between the other first support 230b, the first panel 236, and the second panel 238.

Alternatively, and as seen in FIG. 6 for example, the second panel 238 may be rotatably connected to the first support 230a by a first rotational connection or group of rotational connections 199a, while the first support 230a may be rotatably connected to the first panel 236 by a second rotational connection or group of rotational connections 199b, in a manner similar to that shown in FIG. 3A. In this case, first panel 236 and second panel 238 may not be directly connected by a common rotational connection. However, the second panel 238 and the first panel 236 may be rotatable with respect to each other by virtue of the rotational connections 199a between the first support 230a and the second panel 238, and the rotational connections 199b between the first support 230a and the first panel 236. As shown in FIG. 6, first and second panels 236 and 238 may be rotated about rotational connections 199a and 199b, respectively, to their deployed orientations as shown in FIG. 5. Similar connections may be formed between the other first support 230b, the first panel 236, and the second panel 238.

Alternatively, of the first supports 230a and 230b, the first panel 236, and the second panel 238 may be rotatably connected to each other along a common or shared rotational connection. In a particular embodiment, all of the first support 30a, the first panel 36, and the second panel 38 may be rotatably and coaxially connected to each other along a common or shared rotational connection, as shown in FIG. 3B. For example, a hinge element may extend from an edge of the first support 230a, and additional hinge elements connected to the first panel 236 and second panel 238 may be rotationally connected to the first support hinge element using a common hinge pin to form rotational connections similar to connections 99e provided for first supports 30a and 30b, the first panel 36, and the second panel 38, as previously described.

FIG. 6 is a schematic side view of the foldable table structure 221 of FIG. 5, shown in a folded condition. FIG. 6 shows the relative positions of the various panels and supports when the table structure 221 is folded into the cavity 411. Referring to FIGS. 5 and 6, second support first end 232a-1 may be rotatably connected to first support 230a along the body 230a-3 of first support 230a, at rotational connection(s) 199d. As seen in FIG. 6, second support 232a may reside along the second side 230s of first support 230a when the table structure is folded. Similarly, second support first end 232b-1 may be rotatably connected to first support 230b along the body 230b-3 of first support 230b, at rotational connection(s) 199d. Second support 232b may reside along the second side 230u of first support 230b when the table structure is folded.

Third support first end 234a-1 may be rotatably connected to first support 230a along body 230a-3 of the first support, at a rotational connection 199c. As seen in FIG. 6, third support 34a resides along the first side 230r of first support 230a when the table structure is folded. Also, third support first end 234b-1 may be rotatably connected to first support 230b along body 230a-3 of the first support, at a rotational connection 199c. Third support 234b resides along the first side 230t of first support 230b when the table structure is folded.

Length 236L of the first panel 236, length 238L of the second panel 238, lengths 230aL and 230bL of the first supports 230a and 230b, lengths 232aL and 232bL of the second supports 232a and 232b, and lengths 234aL and 234bL of the third supports 234a and 234b may be specified to any values required or desirable for a particular application, depending on such factors as the dimensions of the floor or cargo bed in which the table structure is to be stowed, the available height within any enclosure in which the table structure is to be deployed, and other pertinent factors.

FIG. 6 also shows schematically various rotational connections between elements of the table structure 221. For example, FIG. 6 schematically illustrates rotational connection(s) 199b between first panel 236 and first support 230a and between first panel 236 and first support 230b, enabling relative rotation of the first panel 236 and the first support 230a and relative rotation of the first panel 236 and the first support 230b. The rotational connection(s) 199b between first panel 236 and first support 230a and between first panel 236 and first support 230b may be coaxial or substantially coaxial. Also, FIG. 6 schematically illustrates rotational connection(s) 199a between first support 230a and second panel 238 and between first support 230b and second panel 238, enabling relative rotation of the first support 230a and the second panel 238 and relative rotation of the of the first support 230b and the second panel 238. The rotational connection(s) 199a may also be coaxial or substantially coaxial. Also, FIG. 6 schematically illustrates rotational connection(s) 199e between first panel 236 and third panel 240, enabling relative rotation of the first panel 236 and the third panel 240. Also, FIG. 6 schematically illustrates rotational connection(s) 199c between first support 230a and third support 234a and between first support 230b and third support 234b, enabling relative rotation of the first support 230a and third support 234a, and relative rotation of the first support 230b and third support 234b. The rotational connection(s) 199c may also be coaxial or substantially coaxial. Also, FIG. 6 schematically illustrates rotational connection(s) 199d between first support 230a and second support 232a and between first support 230b and second support 232b, enabling relative rotation of the first support 230a and second support 232a and relative rotation of the first support 230b and second support 232b. The rotational connection(s) 199d may also be coaxial or substantially coaxial. In a manner similar to that described for the embodiment shown in FIGS. 1-4E, one or more of the rotational connections just described may be combined into a single rotational connection, such as a shared hinge mechanism, for example.

Unfolding or deploying the table structure 221 will now be discussed with reference to FIGS. 7A-7E.

Figure 7A:
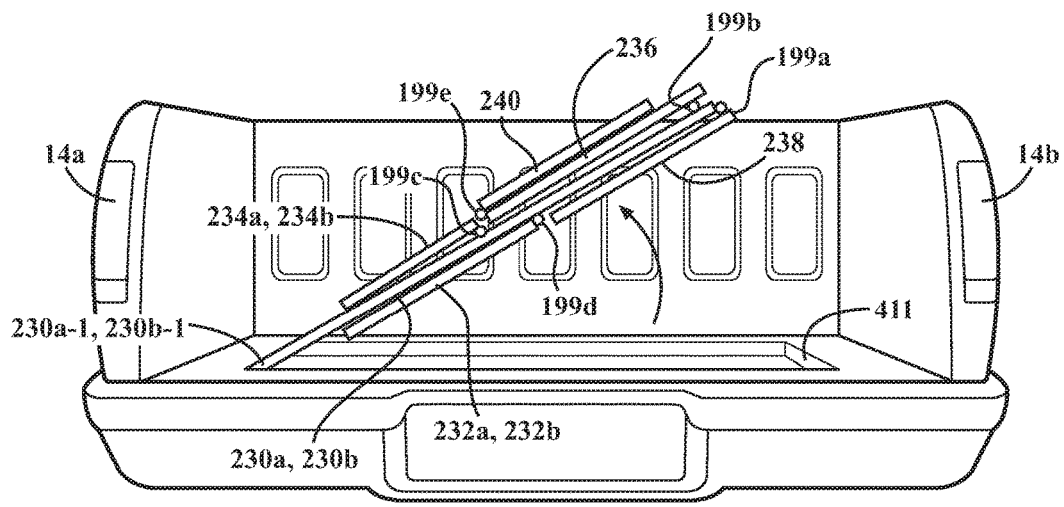
FIGS. 7A-7E are schematic side views of the table structure of FIGS. 5 and 6 as viewed from a position behind the rear of the pickup truck, illustrating a method of deployment of the table structure.

Referring to FIG. 7A, in a first step, the entire table structure 221 may be rotated out of the cargo bed cavity 411 in its folded condition, about edges of the cavity 411 at or near which the first ends 230a-1 and 230b-1 of first supports 230a and 230b reside when the table structure 221 is received in the cavity 411 in the stowed condition.

Figure 7B:
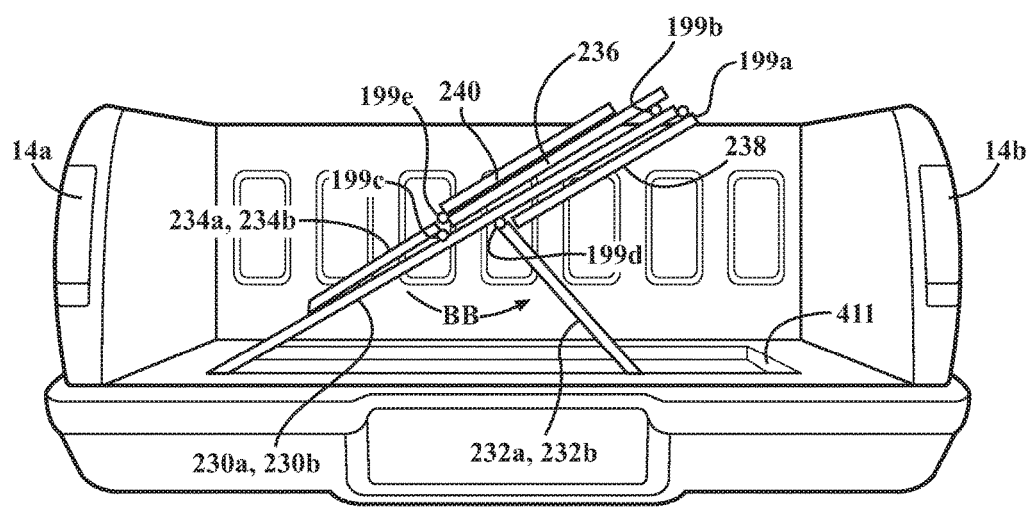

After the folded table structure 221 is rotated out of the cavity 411 to a sufficient degree, second support 232a may be rotated about a rotatable connection 199d away from first support 230a in the direction of arrow BB, as shown in FIG. 7B. Second support 232a may be rotated to a configuration where second support second end 232a-2 may be positioned on a bearing surface on which the deployed table is to rest. In this orientation, the second support 232a may help support the first support 230a in its raised orientation. The bearing surface may be a floor of cavity 411 or another surface. In one or more arrangements, the cavity floor may include corrugations or serrations (not shown) structured to provide bearing surfaces for the second ends 232a-2, 232b-2 of second supports 232a, 232b, respectively, when the second supports are unfolded. The amount of rotation of the second support 232a with respect to the first support 230a may be controlled using a suitable rotational hard stop, as previously described.

Similarly, after the folded table structure 221 is rotated out of the cavity 411 to a sufficient-degree, second support 232b may be rotated about rotatable connection(s) 199d away from first support 230b in the direction of arrow BB. Second support 232b may be rotated to a configuration where second support second end 232b-2 may be positioned on a bearing surface on which the deployed table structure is to rest. In this orientation, the second support 232b may help support the first support 230b in its raised orientation. The amount of rotation of the second support 232b with respect to the first support 230b may be controlled using cavity floor bearing surfaces or a suitable rotational hard stop, as previously described.

Figure 7C:
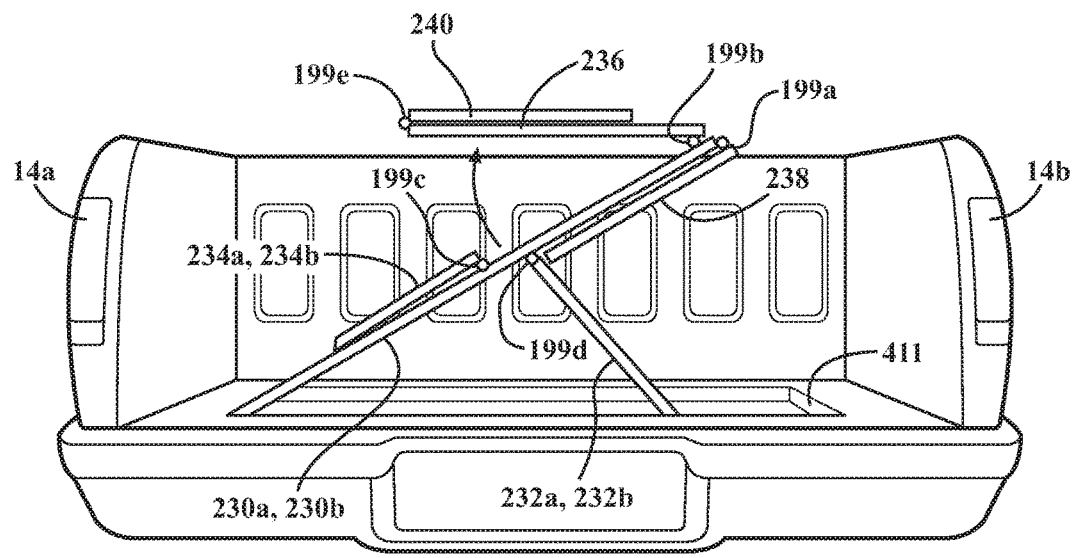

Referring to FIG. 7C, in a next step, the first panel 236 and the third panel 240 may be rotated about rotational connection(s) 199b until the first panel first surface 236c is horizontal.

Figure 7D:
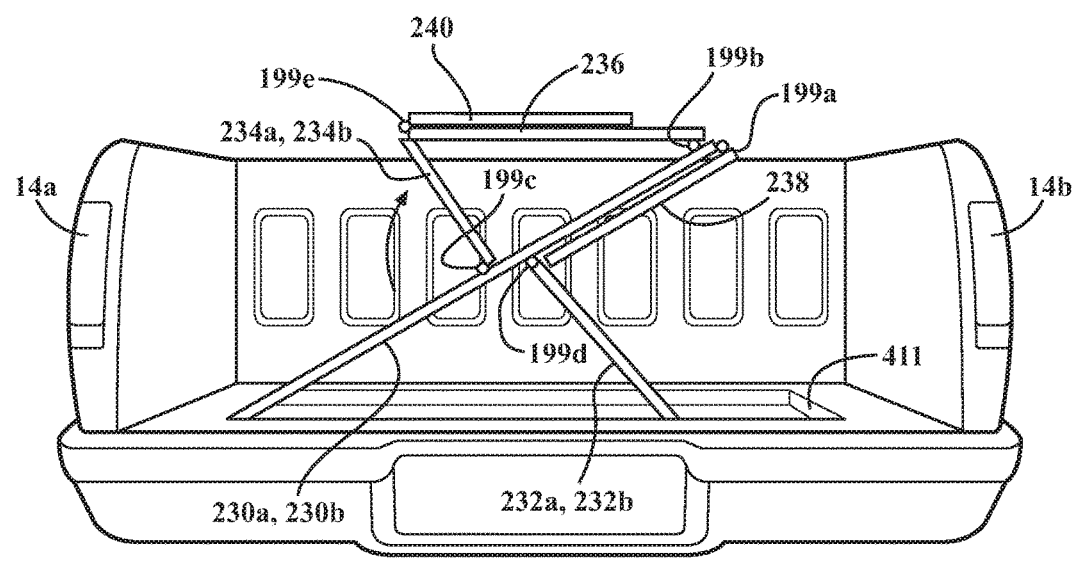

Next, referring to FIG. 7D, third supports 234a and 234b may be rotated with respect to first supports 230a and 230b, respectively, about rotational connection(s) 199c. Third support 234a may be rotated upwardly into contact with first panel 236 so as to help support and maintain the first panel 236 in a horizontal orientation. One or more hardware elements may be positioned at third support first end 232a-1 and/or along the first panel 236, to help locate the desired contact location and maintain contact. Similarly, third support 234b may be rotated into contact with first panel 236 so as to help support and maintain the first panel 236 in a horizontal orientation. One or more hardware elements may be positioned at third support first end 232b-1 and/or along the first panel 236, to help locate the desired contact location and maintain contact.

Figure 7E:
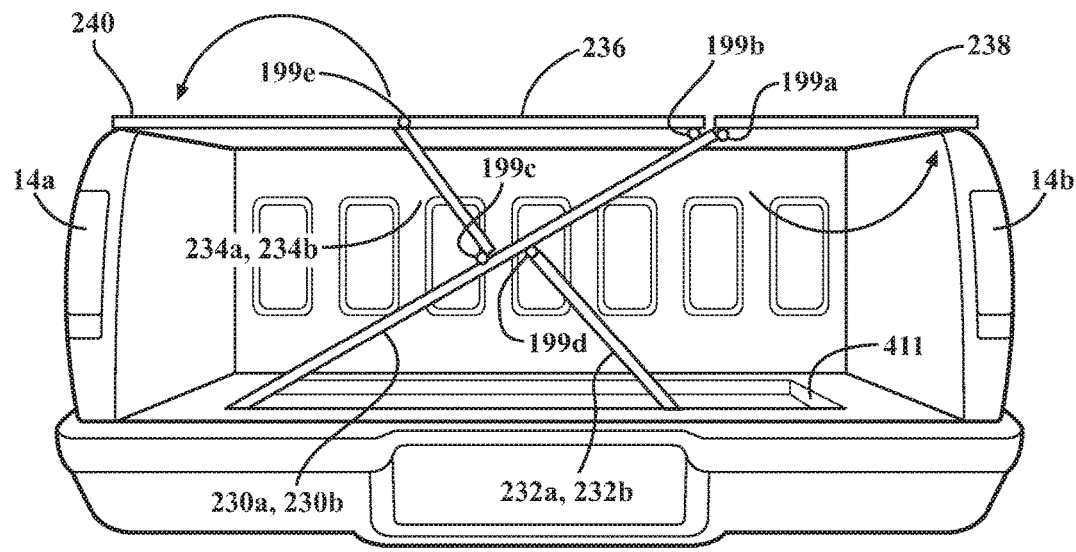

Referring to FIG. 7E, in a next step, the second panel 238 may be rotated about rotational connection(s) 199a into a horizontal orientation. In an embodiment where the table top is structured to extend over or past the cargo bed sidewalls, it may be necessary to rotate ends 230a-2, 230b-2 of supports 230a and 230b past their final resting positions, so that second panel 238 can clear the sidewall 14b during unfolding. The first and second panels 236 and 238 may be structured and rotatably connected to each other and/or to other portions of the table structure so that first panel first surface 236c and second panel first surface 238c are coplanar or substantially coplanar when the panels 236 and 238 are oriented and secured horizontally as shown in FIG. 7E. The second panel 238 may then be locked in this horizontal orientation using a locking mechanism (not shown) positioned at a junction between the first panel 236 and the second panel 238. In this orientation and position, the second panel may be secured adjacent to first panel 236 so that first panel first surface 236c and second panel first surface 238c are adjacent each other, combining to form a portion of table top 237 for the table structure 221 in the deployed condition.

Also referring to FIG. 7E, the third panel 240 may be rotated with respect to first panel 236 about rotational connection(s) 199e into a horizontal orientation. The first and third panels 236 and 240 may be structured and rotatably connected to each other and/or to other portions of the table structure so that first panel first surface 236c and third panel first surface 240c are coplanar or substantially coplanar when the panels 236 and 240 are oriented and secured horizontally as shown in FIG. 7E. The third panel 240 may then be locked in this orientation using a locking mechanism (not shown) positioned at a junction between the first panel 236 and the third panel 240. In this orientation and position, the third panel 240 may be secured adjacent to first panel 236 so that first panel first surface 236c and third panel first surface 240c are adjacent each other and coplanar or substantially coplanar, combining to form a portion of table top 237 for the table assembly 221 in the deployed condition. The elements of the table structure 221 may be structured and connected so that the table top 237 of the deployed table structure resides at a height which permits users to comfortably use the table when seated along upper surfaces of the bed sidewalls and/or the tailgate.

The table structure may be folded back into its stowable or folded configuration by reversing the procedure described above.

As seen in the drawings and as described herein, embodiments of the foldable table structure may be mountable to a vehicle and may be configurable to a folded condition and a deployed condition. One or more embodiments of the table structure may include a first panel structured to form at least a first portion of a table top when the table structure is in a deployed condition, and at least one first support rotatably connected to the first panel. The at least one first support may be rotatable so as to extend between the first panel and a surface on which the table structure is to rest in the deployed condition, to support the first panel when the table structure is in the deployed condition. At least one second support may be rotatably connected to the at least one first support. The at least one second support may be rotatable to extend between the at least one first support and a surface on which the table structure is to rest in the deployed condition, to support the at least one first support when the table structure is in the deployed condition. Also, at least one third support may be rotatably connected to the first panel. The at least one third support may be rotatable to extend between the first panel and the at least one first support to support the first panel when the table structure is in the deployed condition.

One or more embodiments of the foldable table structure may further include a second panel rotatably connected to at least one of the first panel and the at least one first support. The second panel may be structured to form at least a second portion of the table top adjacent the first panel when the table structure is in a deployed condition. One or more embodiments of the foldable table structure may further include a third panel rotatably connected to the second panel. The third panel may be structured to form at least a third portion of the table top adjacent the second panel when the table structure is in a deployed condition.

Figure 9:
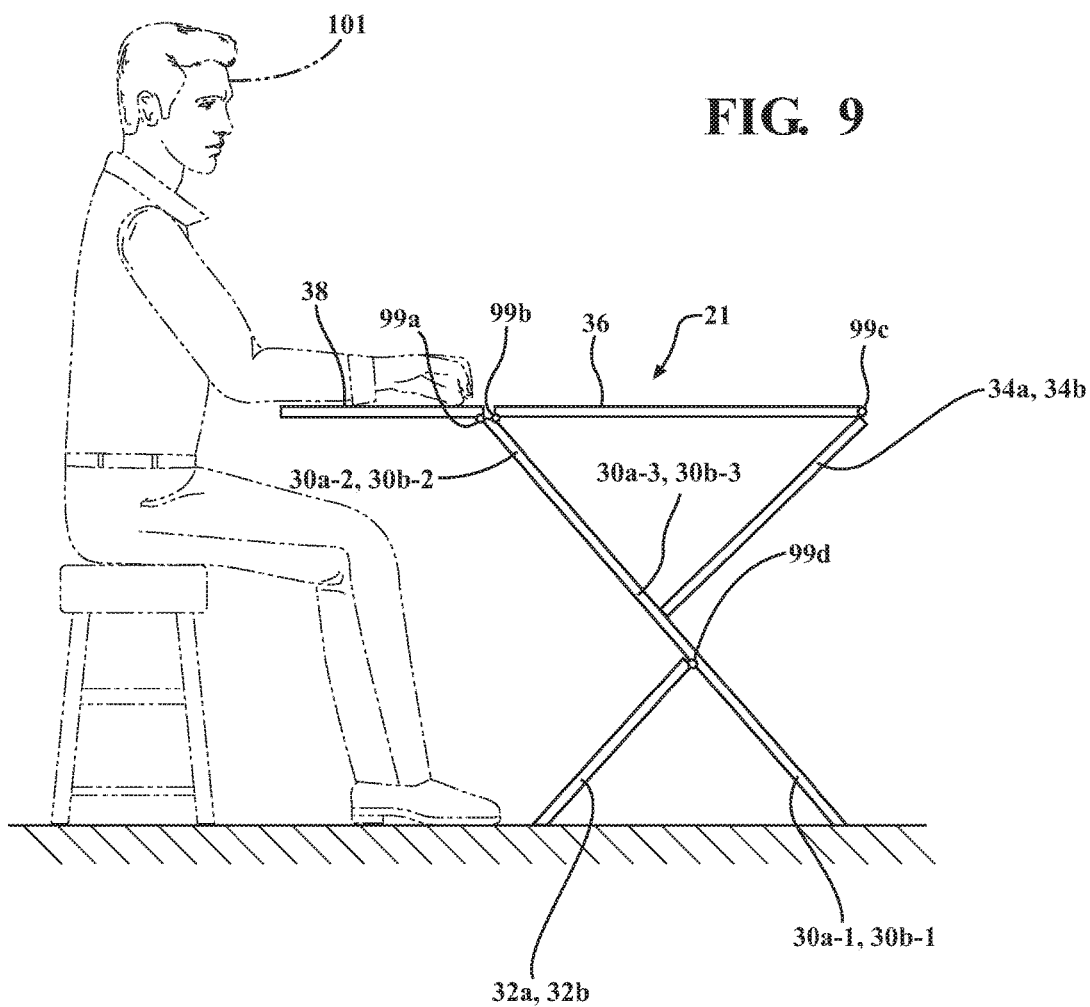
FIG. 9 is a schematic perspective view of the table structure embodiment shown in FIGS. 1-4E, shown in a deployed condition and positioned outside the cargo bed of a pickup truck.

Referring to FIG. 9, an embodiment of the foldable table structure described herein may be structured to be detachable from the vehicle. For example, as stated previously, one or more of first support first end 30*a*-1 and first support first end 30*b*-1 may be connected to a floor or wall of cavity 311 using pins or another easily actuatable securement mechanism (not shown) which secures the table structure to the vehicle, permits rotation of the first supports 30*a* and 30*b* with respect to the vehicle, and which may be actuated to permit removal of the table structure from the vehicle. After removal of the table structure from the vehicle, the table structure may be positioned on the ground or other surface and unfolded to the deployed configuration shown in FIG. 9, as previously described. Locks, hard stops, etc. may be incorporated into the structure to maintain the table structure in the deployed configuration when the structure is positioned on the ground 103 or otherwise outside the cargo bed.

Figure 11:
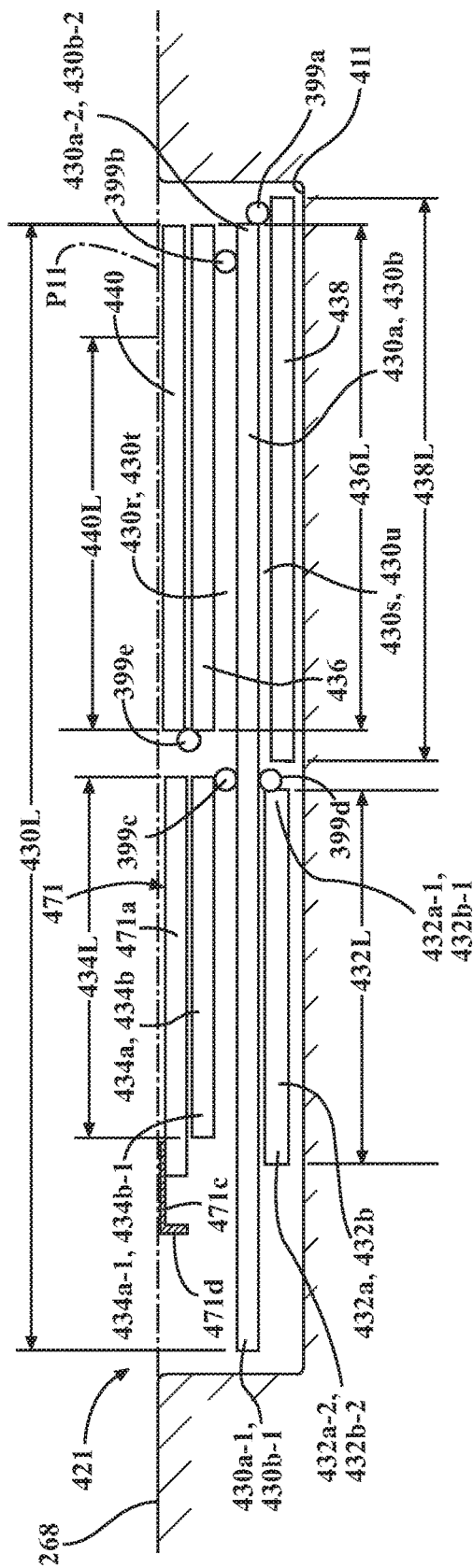
FIG. 11 is a schematic side view of the table structure embodiment of FIG. 10 shown in a folded condition and positioned, along with the table structure width extension member shown in FIG. 10, in a recess or cavity formed in a floor surface of the cargo bed, as viewed from a position behind the rear of the pickup truck.

FIGS. 10-11 show a variation 421 of the table structure 221 shown in FIGS. 5-7E. The embodiment 421 shown in FIGS. 10-11 may be structurally and operationally largely identical to the embodiment 221 shown in FIGS. 5-7E. FIG. 10 is a schematic perspective view of a table structure in accordance with an embodiment incorporating a table structure width extension member 471 as described herein, shown in a deployed condition and mounted in a cargo bed of a pickup truck. For features common to both embodiments, reference numerals in FIGS. 10-11 have been incremented by "200" over the reference numerals shown in FIGS. 5-7E.

The table structure 421 in FIGS. 10-11 may be structurally and operationally identical to the embodiment 221 shown in FIGS. 5-7E except as follows. In the table structure 421 of FIGS. 10-11, a table structure width extension member 471 may be provided for optional attachment to portions of the table structure incorporating the table top surfaces. The table structure width extension member may be mountable along an edge of at least one of the first panel 436, the second panel 438, and the third panel 440, when the table structure 421 is in the deployed condition. Extension member 471 operates to increase a width dimension W21 of the table structure 221 shown in FIGS. 5-7E when the extension member 471 is attached to a rear-most edge of the table structure, as shown in FIGS. 10-11.

In one arrangement, the extension member 471 may include an extension panel 471*a* formed, for example, from the same material(s) as panels 436, 438, and/or 440. One or more attachment members 471*b* may be secured to the panel 471*a* along a length of the panel. Each attachment member 471*b* may have a base portion 471*c* structured for attachment to the panel 471*a*, and a projection 471*c* structured so as to extend from the base portion 471*b* in a direction toward one of the table top panels 436, 438, 440 when the attachment member is secured to the panel 471*a* and the extension member 471 is positioned as shown in FIGS. 10 and 10A to engage the table top panels 436, 438, 440.

Attachment members 471*b* are attached to panel 471*a* at locations along the length of the panel so as to correspond to locations of associated slots or holes formed in table top panels 436, 438, 440, thereby enabling the projection on each attachment member to be inserted into a corresponding hole in one of the table top panels 436, 438, 440. For example, FIG. 10 shows an attachment member projection-receiving hole 440*h* formed in panel 440, an attachment member projection-receiving hole 436*h* formed in panel 436, and an attachment member projection-receiving hole 438*h* formed in panel 438.

When it is desired to extend an effective width of the table surface to a width W21 so that the table top surface 437 extends over or past a top surface of the tailgate 14*c* when the tailgate is in the raised position, the table structure 421 shown in FIGS. 10-11 (minus the extension member 471) may be deployed in the same manner as table structure 221, as previously described. Then, each projection 471*d* of an attachment member 472*b* may be aligned with an associated hole in one of panels 436, 438, 440. The projections 471*d* may then be inserted into the associated holes. FIG. 10A is a partial cross-sectional view showing a projection 471*d* of an attachment member 471*b* inserted into an associated hole 440*h* formed in panel 440. The projections 471*d* and panel holes 440*h*, 436*h*, 438*h* may be dimensioned so as to provide a close fit between the projections and holes when the projections are inserted into the holes. When the projections are inserted into the holes, the extension member 471 is attached to the remainder of the table top 437 so as to form an extended portion of the table top 437. The width extension member 471 may be easily added or removed as needed.

FIG. 11 is a schematic side view similar to the view of FIG. 6, showing the table structure of FIG. 10 in a folded condition and positioned in a recess or cavity formed in a floor surface of the cargo bed. FIG. 11 illustrates one manner in which the width extension member 471 may be stowed in the same cargo bed cavity as the folded table structure. The width extension member may be positioned atop panel 434 within the cargo bed cavity 411. When the width extension member 471 is stowed, the length dimension 471L of the extension member may extend along an axis which is parallel to a fore-aft axis of the vehicle. In addition, as seen in FIG. 11, the combined thickness of the attachment members 471*b* and the extension panel 471*a* may be specified such that the combination of the width extension member 471 and the remainder of the table structure 421 does not extend above the floor surface 268 when the table structure is positioned in the cavity in the folded condition.

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle comprising:
   a cargo bed; and
   a foldable table structure configured to be mountable in the cargo bed, the foldable table structure comprising:
   a first panel structured to form a first portion of a table top when the table structure is in a deployed condition;
   a second panel structured to form a second portion of the table top when the table structure is in the deployed condition;
   at least one first support, and
   at least one second support having an end attached to the at least one first support so as to be rotatable with respect to the at least one first support, about an axis of rotation that is fixed with respect to both of the at least one first support and the at least one second support,
   each of the at least one first support, the first panel, and the second panel being rotatably connected to at least one other of the at least one first support, the first panel, and the second panel, such that the first panel is rotatable to reside along a first side of the at least one first support, and such that the second panel is rotatable to reside along a second side of the at least one first support opposite the first side,
   wherein the at least one second support resides along the second side of the at least one first support, and wherein the at least one second support is structured to be engageable with a surface on which the table structure is to rest when in the deployed condition, to support the at least one first support when the table structure is in the deployed condition,
   the foldable table structure further comprising a third panel structured to form a third portion of the table top when the table structure is in the deployed condition,
   wherein at least one of the second panel and the third panel is configured to overlie at least a portion of at least a first sidewall of the cargo bed when the table structure is in the deployed condition.

2. The vehicle of claim 1 wherein the foldable table structure is structured to be pivotable about an end of the at least one first support when the table structure is mounted on the vehicle.

3. The vehicle of claim 1 wherein the first panel and the second panel are structured to be secured adjacent/adjoining each other to form the table top when the table structure is in the deployed condition.

4. The vehicle of claim 1 further comprising at least one third support rotatably connected to the first panel, the at least one third support being rotatable so as to reside along the first side of the at least one first support when the table structure is in a folded condition.

5. The vehicle of claim 4 wherein the at least one third support is structured to be engageable with the at least one first support so as to support at least a portion of the first panel when the table structure is in the deployed condition.

6. The vehicle of claim 1 wherein the table structure is structured to be detachable from the vehicle.

7. The vehicle of claim 1 wherein the at least one first support resides along a first side of the first panel when the first panel is rotated such that the first panel resides along the first side of the at least one first support, and wherein the third panel is rotatably connected to the first panel such that the third panel is rotatable to reside along a second side of the first panel opposite the first side of the first panel.

8. The vehicle of claim 1 wherein the third panel is structured to be secured adjoining the first panel along a first edge of the first panel and the second panel is structured to be secured adjoining the first panel along a second edge of the first panel opposite the first edge, to form a table top when the table structure is in the deployed condition.

9. The vehicle of claim 1 wherein another one of the second panel and the third panel is configured to overlie at least a portion of a second sidewall of the cargo bed opposite the first sidewall when the table structure is in the deployed condition.

10. The vehicle of claim 1 further comprising a table structure width extension member mountable along an edge of at least one of the first panel, the second panel, and the third panel, when the table structure is in the deployed condition.

11. The vehicle of claim 1 further comprising:
   a floor including a floor surface and a cavity formed in the floor surface, the cavity being structured to receive the foldable table structure in a folded condition therein, wherein the cavity is structured such that the foldable table structure does not extend above the floor surface when the foldable table structure is positioned in the cavity in the folded condition.

12. A foldable table structure to be mountable to a vehicle, the table structure being configurable to a folded condition and a deployed condition, the table structure comprising:
   a first panel structured to form at least a first portion of a table top when the table structure is in the deployed condition;
   at least one first support rotatably coupled to the first panel and rotatable to reside on a first side of the first panel when the table structure is in the folded condition
   a second panel rotatably coupled to the first support, the second panel being structured to form at least a second portion of the table top adjacent the first panel when the table structure is in the deployed condition, the second panel being rotatable to reside on the first side of the first panel with the at least one first support interposed between the second panel and the first panel when the table structure is in the folded condition;

a third panel rotatably coupled to the first panel, the third panel being structured to form at least a third portion of the table top adjacent the first panel when the table structure is in the deployed condition, the third panel being rotatable to reside on a second side of the first panel opposite a first side when the table structure is in the folded condition; and a table structure width extension member mountable along an edge of at least one of the first panel, the second panel, and the third panel, when the table structure is in the deployed condition.

13. A foldable table structure to be mountable on a vehicle, the foldable table structure comprising:

a first panel structured to form a first portion of a table top when the table structure is in a deployed condition;

a second panel structured to form a second portion of the table top when the table structure is in the deployed condition;

at least one first support, and at least one second support having an end attached to the at least one first support so as to be rotatable with respect to the at least one first support, about an axis of rotation that is fixed with respect to both of the at least one first support and the at least one second support, each of the at least one first support, the first panel, and the second panel being rotatably connected to at least one other of the at least one first support, the first panel, and the second panel, such that the first panel is rotatable to reside along a first side of the at least one first support, and such that the second panel is rotatable to reside along a second side of the at least one first support opposite the first side, wherein the at least one second support resides along the second side of the at least one first support, and wherein the at least one second support is structured to be engageable with a surface on which the table structure is to rest when in the deployed condition, to support the at least one first support when the table structure is in the deployed condition, the foldable table structure further comprising a third panel structured to form a third portion of the table top when the table structure is in the deployed condition, the foldable table structure further comprising a table structure width extension member mountable along an edge of at least one of the first panel, the second panel, and the third panel, when the table structure is in the deployed condition, wherein the width extension member is structured to be mountable along edges of all of the first panel, the second panel, and the third panel, when the table structure is in the deployed condition.

\* \* \* \* \*